(12) United States Patent
Sako et al.

(10) Patent No.: US 10,097,244 B2
(45) Date of Patent: Oct. 9, 2018

(54) POWER SUPPLY DEVICE AND POWER RECEIVING DEVICE

(71) Applicant: Sony Corporation, Tokyo (JP)

(72) Inventors: Yoichiro Sako, Tokyo (JP); Takanori Washiro, Kanagawa (JP); Kazuyoshi Takemura, Tokyo (JP); Isao Soma, Saitama (JP); Kuniya Hayashi, Tokyo (JP); Kayoko Tanaka, Tokyo (JP); Taro Tadano, Chiba (JP); Satoshi Higano, Kanagawa (JP); Kazutoshi Serita, Tokyo (JP)

(73) Assignee: Sony Corporation, Tokyo (JP)

( * ) Notice: Subject to any disclaimer, the term of this patent is extended or adjusted under 35 U.S.C. 154(b) by 1059 days.

(21) Appl. No.: 14/383,916

(22) PCT Filed: Feb. 26, 2013

(86) PCT No.: PCT/JP2013/001098
§ 371 (c)(1),
(2) Date: Sep. 9, 2014

(87) PCT Pub. No.: WO2013/136686
PCT Pub. Date: Sep. 19, 2013

(65) Prior Publication Data
US 2015/0028690 A1    Jan. 29, 2015

(30) Foreign Application Priority Data
Mar. 16, 2012    (JP) .................................. 2012-060676

(51) Int. Cl.
*H04B 5/00*    (2006.01)
*H04B 3/54*    (2006.01)
(Continued)

(52) U.S. Cl.
CPC ............ *H04B 5/0037* (2013.01); *H01F 38/14* (2013.01); *H02J 3/005* (2013.01); *H02J 13/002* (2013.01);
(Continued)

(58) Field of Classification Search
CPC ......... H04B 3/54; H04B 5/0037; H02J 50/12; H02J 50/20; H02J 50/65; H02J 50/80;
(Continued)

(56) References Cited

U.S. PATENT DOCUMENTS 5,742,229 A    4/1998    Smith
8,108,081 B2    1/2012    Lenox
(Continued)

FOREIGN PATENT DOCUMENTS

EP    2246957 A1    11/2010
JP    57-132460 A    8/1982
(Continued)

OTHER PUBLICATIONS

[No Author Listed], Near-Field Communication. Wikipedia. Accessed online Jan 5, 2015. http://en.wikipedia.org/wiki/Near_field_communication. 16 pages.
(Continued)

*Primary Examiner* — Hal Kaplan
(74) *Attorney, Agent, or Firm* — Chip Law Group

(57) ABSTRACT

Devices and methods for supply or receiving electric power. A power supply method may include specifying a type of a power source, specifying a power receiving capability of a power receiving device, performing collation of the specified type of the power source with the specified power receiving capability, and controlling transmission of electric power from the power source of the specified type to the power receiving device based on the collation. A power receiving method may include specifying a type of a power
(Continued)

source, specifying a power receiving capability of a power receiving device, performing collation of the specified type of the power source with the specified power receiving capability, and controlling, based on the collation, selective conversion of electric power transmitted from the power source of the specified type to the power receiving device.

24 Claims, 12 Drawing Sheets

(51) Int. Cl.
    *H01F 37/00*      (2006.01)
    *H02J 50/20*      (2016.01)
    *H02J 50/05*      (2016.01)
    *H02J 50/12*      (2016.01)
    *H02J 50/80*      (2016.01)
    *H02J 3/00*      (2006.01)
    *H02J 13/00*      (2006.01)
    *H01F 38/14*      (2006.01)
    *H02J 7/00*      (2006.01)

(52) U.S. Cl.
    CPC .......... *H02J 13/0075* (2013.01); *H02J 50/05* (2016.02); *H02J 50/12* (2016.02); *H02J 50/20* (2016.02); *H02J 50/80* (2016.02); *H02J 2007/0001* (2013.01); *Y02E 60/7815* (2013.01); *Y02E 60/7853* (2013.01); *Y04S 40/121* (2013.01); *Y04S 40/126* (2013.01)

(58) Field of Classification Search
    CPC .. H02J 3/005; H02J 5/005; H02J 7/025; H02J 13/002; H02J 13/0075; H02J 2007/0001; H01F 38/14; Y02E 60/7815; Y02E 60/7853; Y04S 40/121; Y04S 40/126
    USPC .............................................. 307/1, 3–4, 104
    See application file for complete search history.

(56) References Cited

U.S. PATENT DOCUMENTS

| | | |
|---|---|---|
| 2002/0000793 A1 | 1/2002 | Hanaki |
| 2002/0158749 A1 | 10/2002 | Ikeda et al. |
| 2005/0127757 A1 | 6/2005 | Wilson et al. |
| 2008/0197802 A1 | 8/2008 | Onishi et al. |
| 2009/0177580 A1 | 7/2009 | Lowenthal et al. |
| 2010/0026087 A1* | 2/2010 | Morita ............. H04B 3/54 307/3 |
| 2010/0141204 A1 | 6/2010 | Tyler et al. |
| 2010/0201306 A1 | 8/2010 | Kazama et al. |
| 2011/0006603 A1 | 1/2011 | Robinson et al. |
| 2011/0022222 A1 | 1/2011 | Tonegawa |
| 2011/0181239 A1* | 7/2011 | Kadoyama ............ H02J 7/025 320/108 |

FOREIGN PATENT DOCUMENTS

| | | |
|---|---|---|
| JP | 2006-013683 A | 1/2006 |
| JP | 2006-109022 A | 4/2006 |
| JP | 2006-262570 A | 9/2006 |
| JP | 2008-047410 A | 2/2008 |
| JP | 2009-094768 A | 4/2009 |
| JP | 2009-164924 A | 7/2009 |
| JP | 2009-171700 A | 7/2009 |
| JP | 2010-092232 A | 4/2010 |
| WO | WO 2009/126811 A2 | 10/2009 |
| WO | WO 2011/067655 A2 | 6/2011 |
| WO | WO 2011/094627 A1 | 8/2011 |
| WO | WO 2012/026353 A1 | 3/2012 |

OTHER PUBLICATIONS

[No Author Listed], Power-line communication. Wikipedia. Accessed online Jan 5, 2015. http://en.wikipedia.org/wiki/Power-line_communication. 5 pages.

* cited by examiner

[Fig. 1]
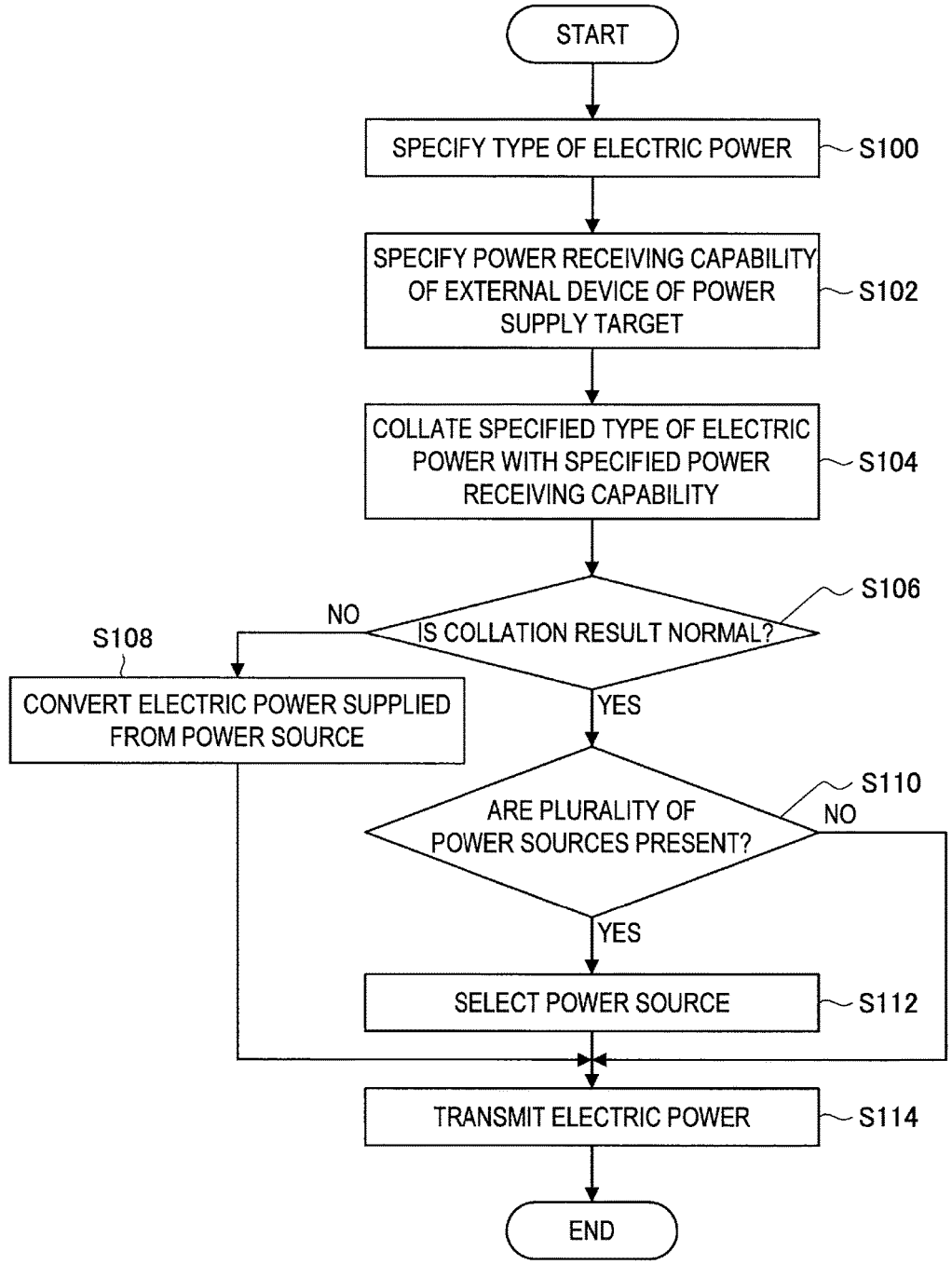

[Fig. 2]
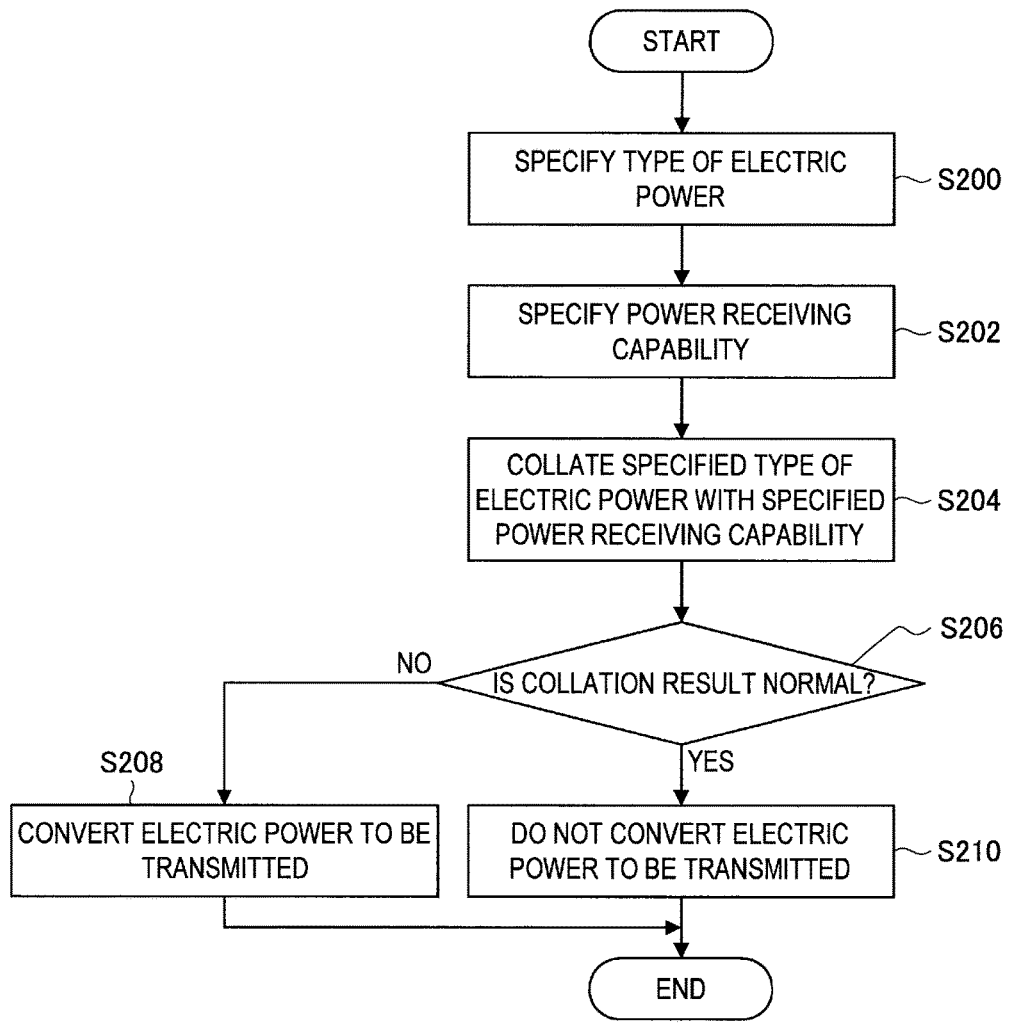

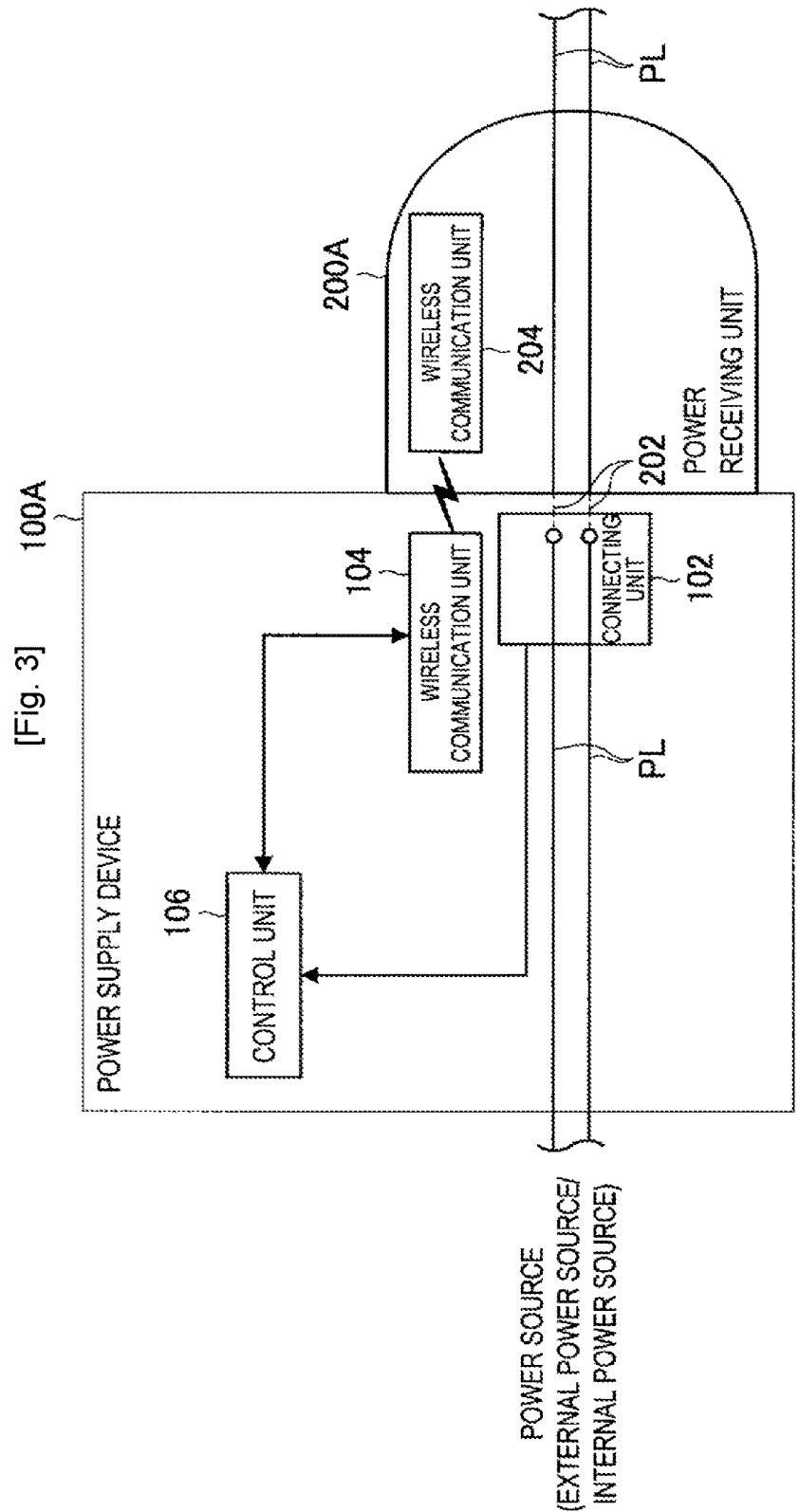

[Fig. 4]
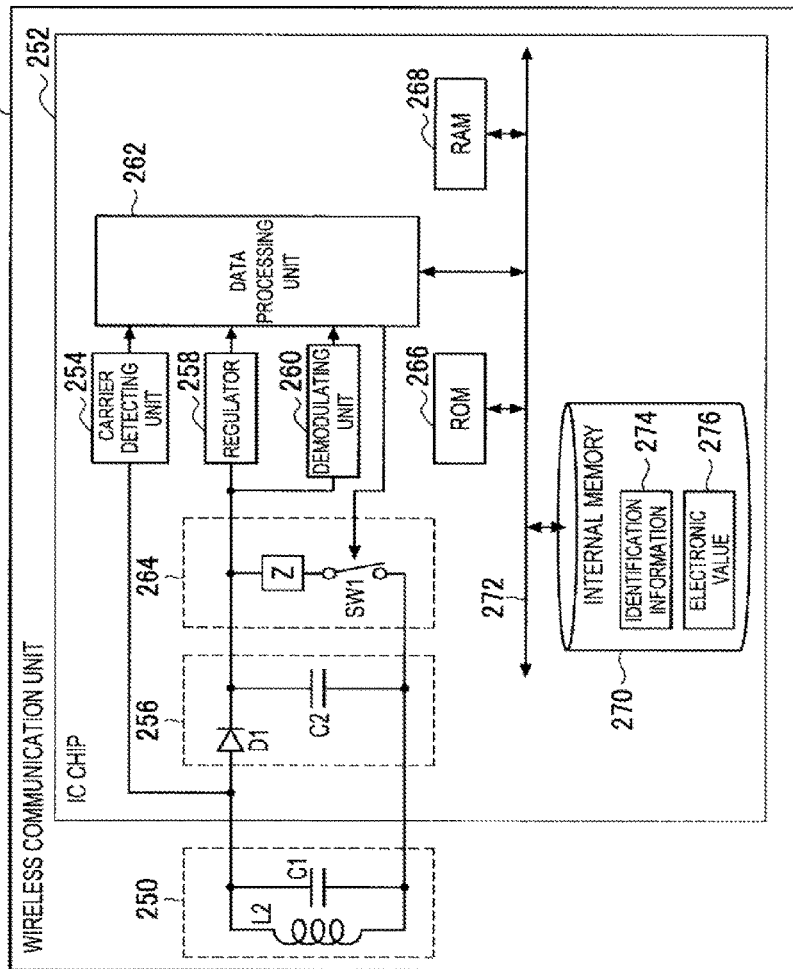
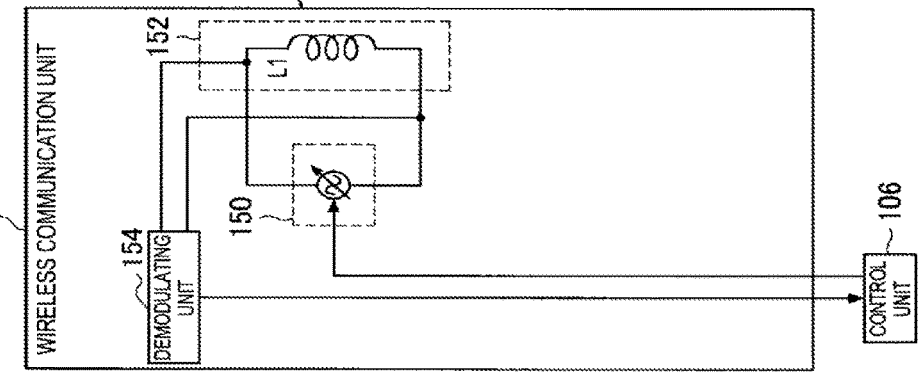

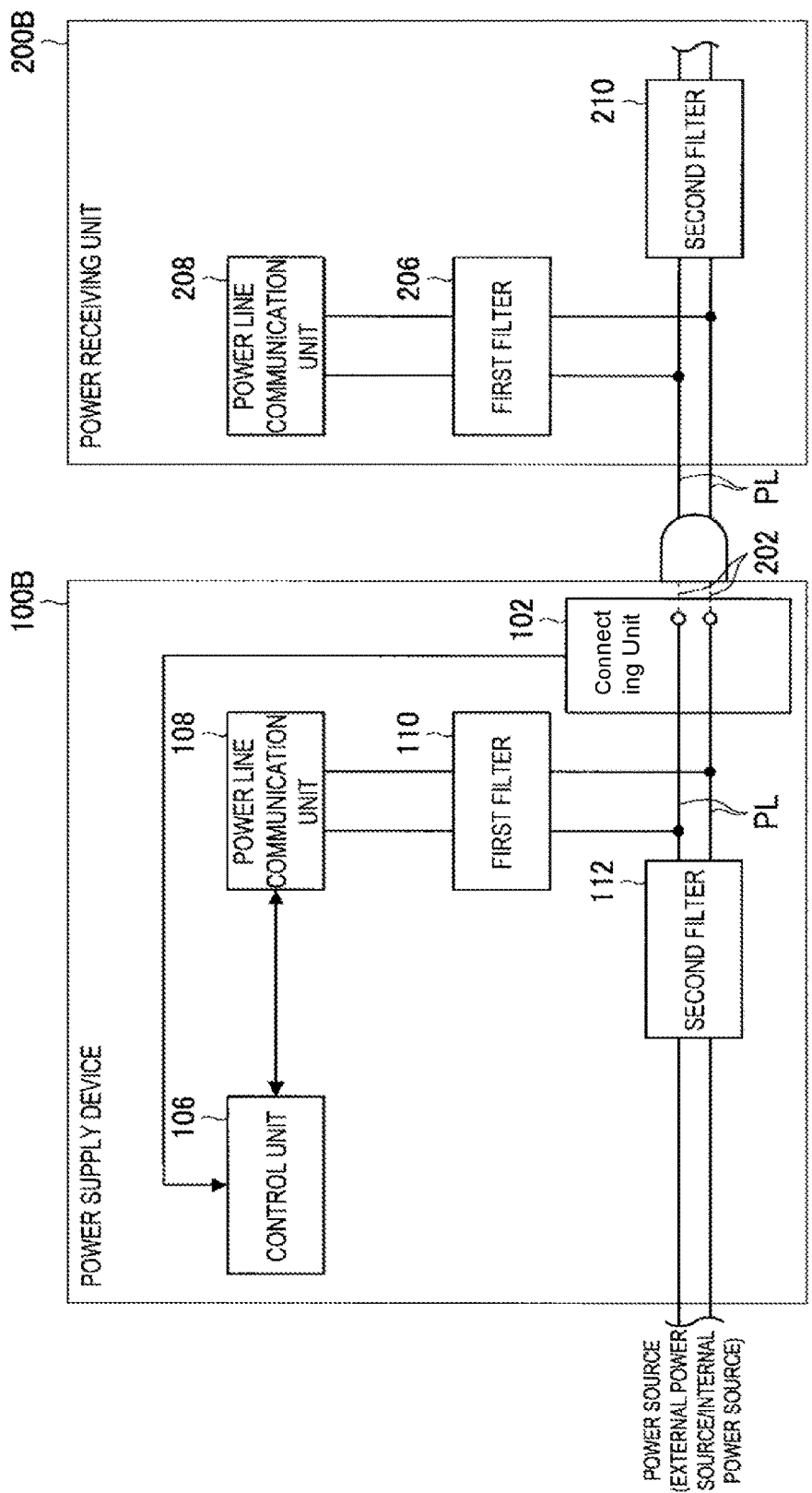

[Fig. 6]
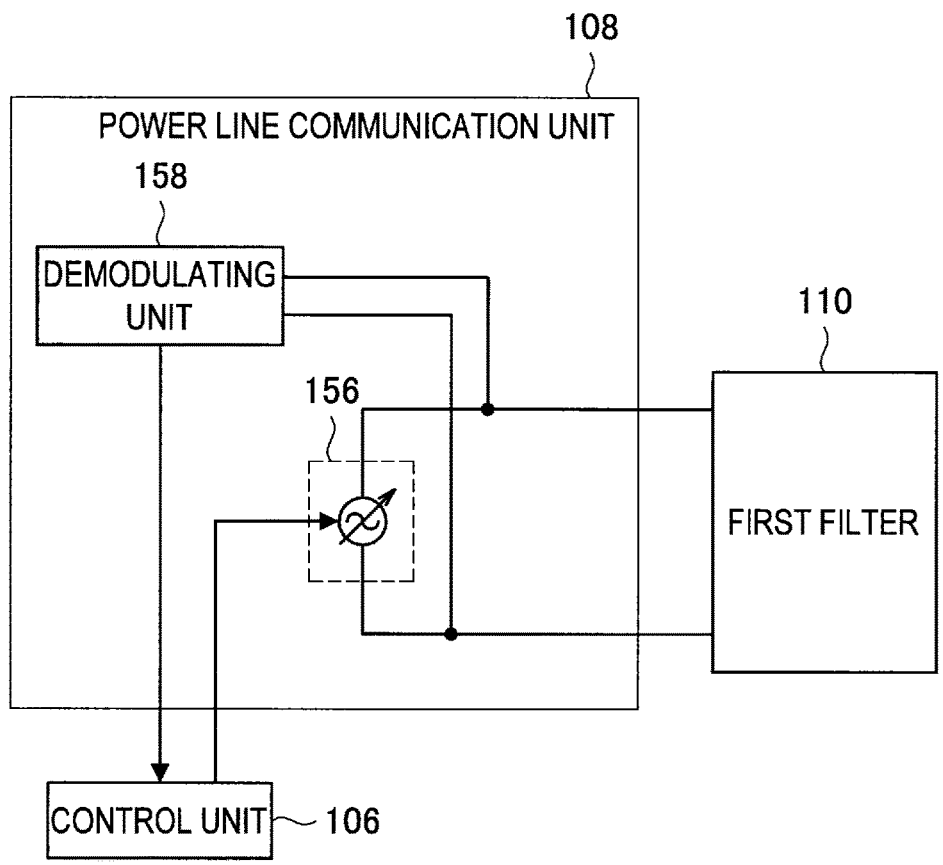

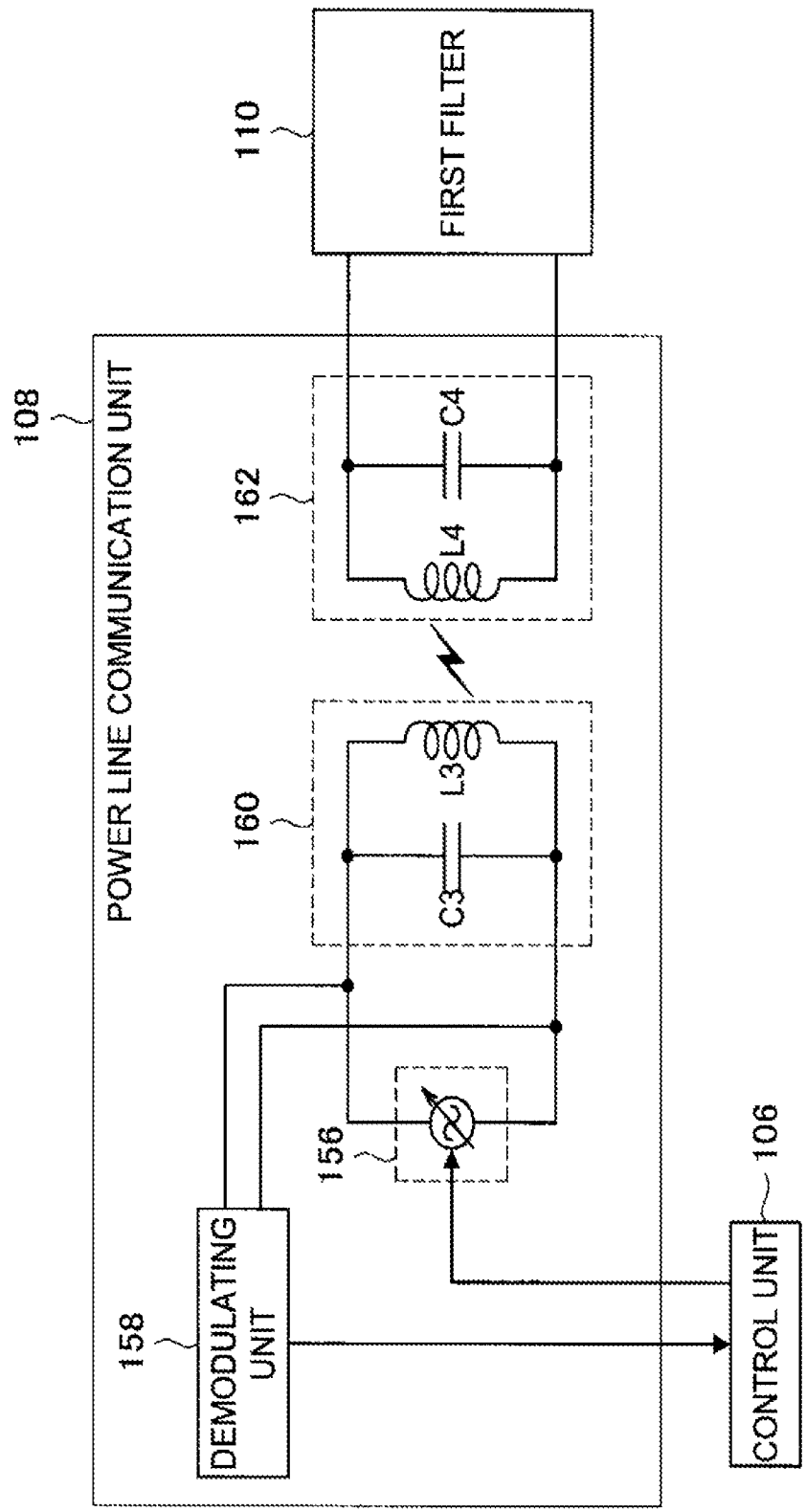

[Fig. 8]
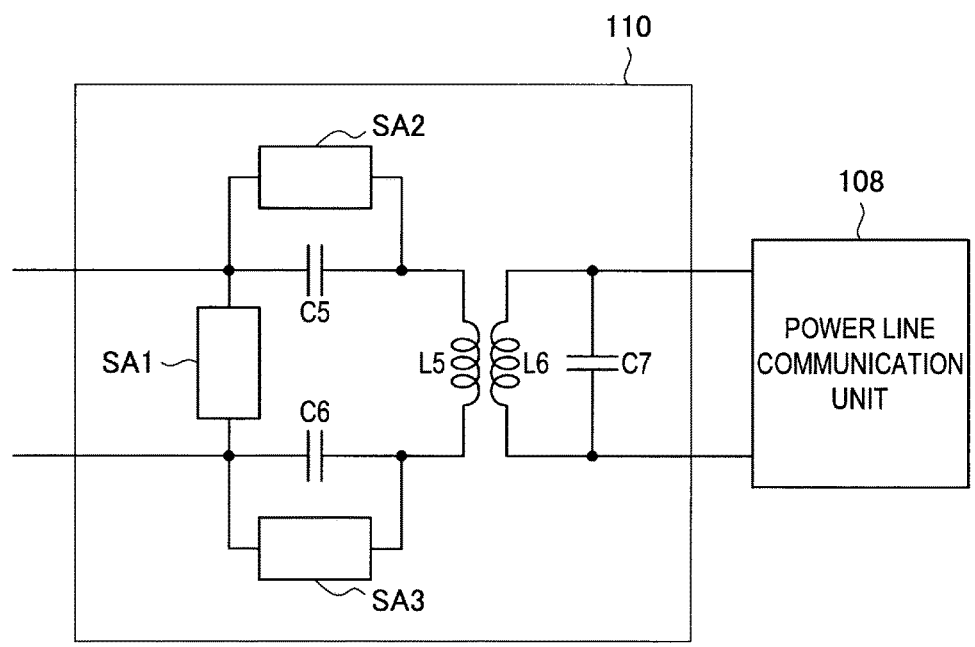
[Fig. 9]
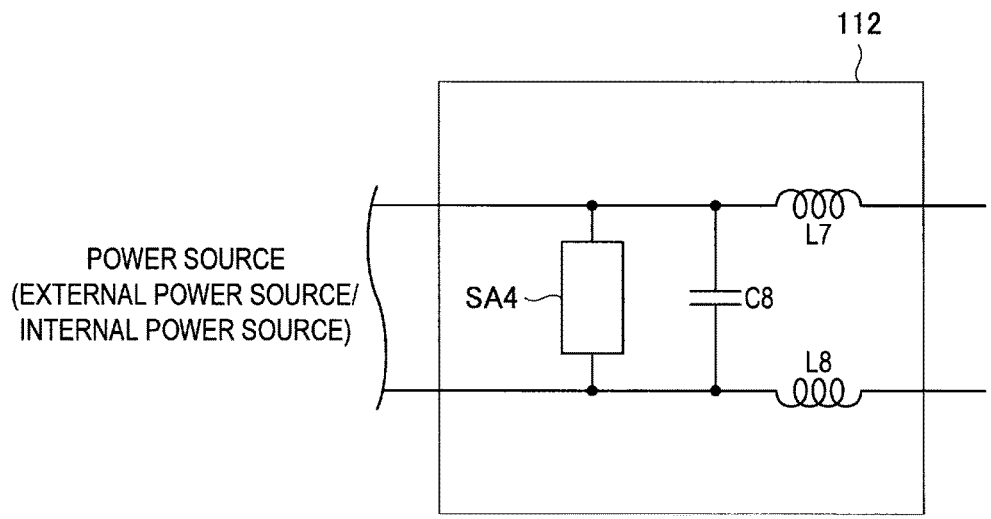

[Fig. 10]
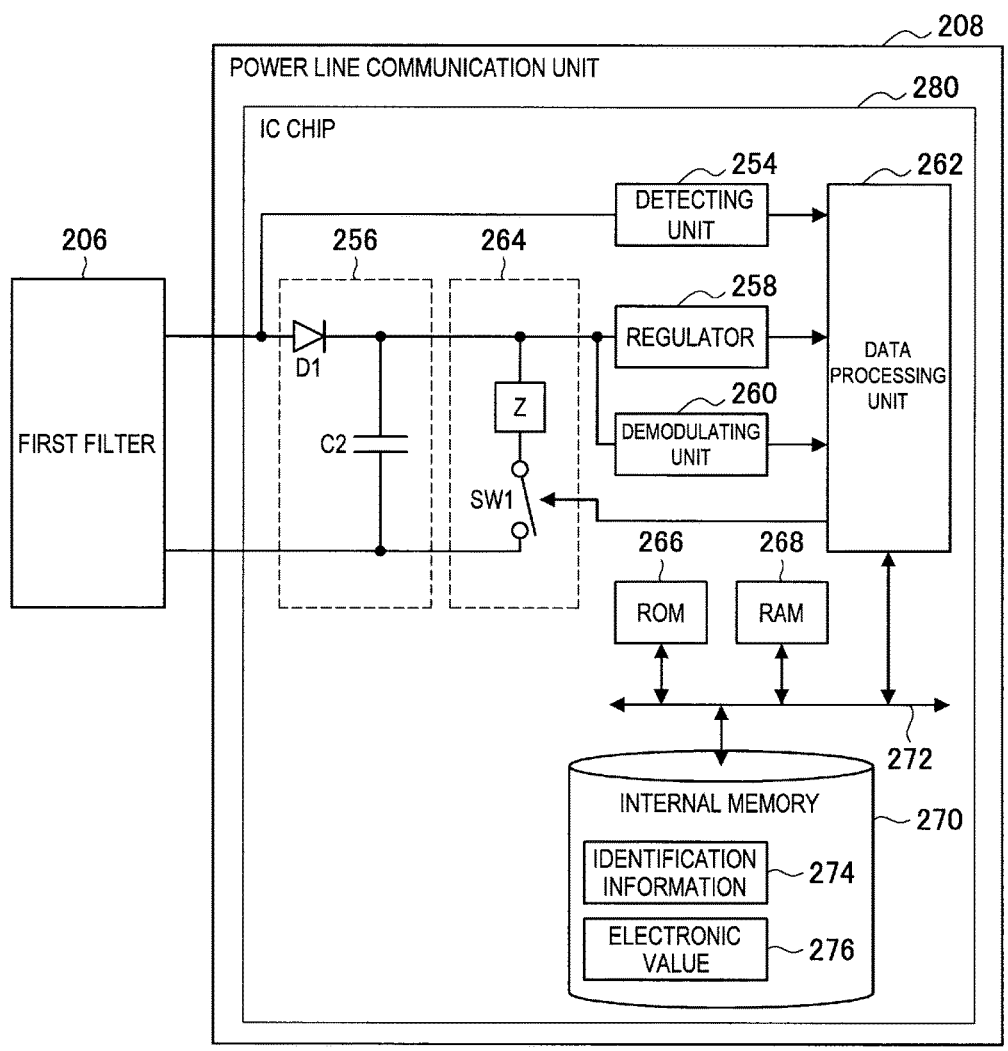

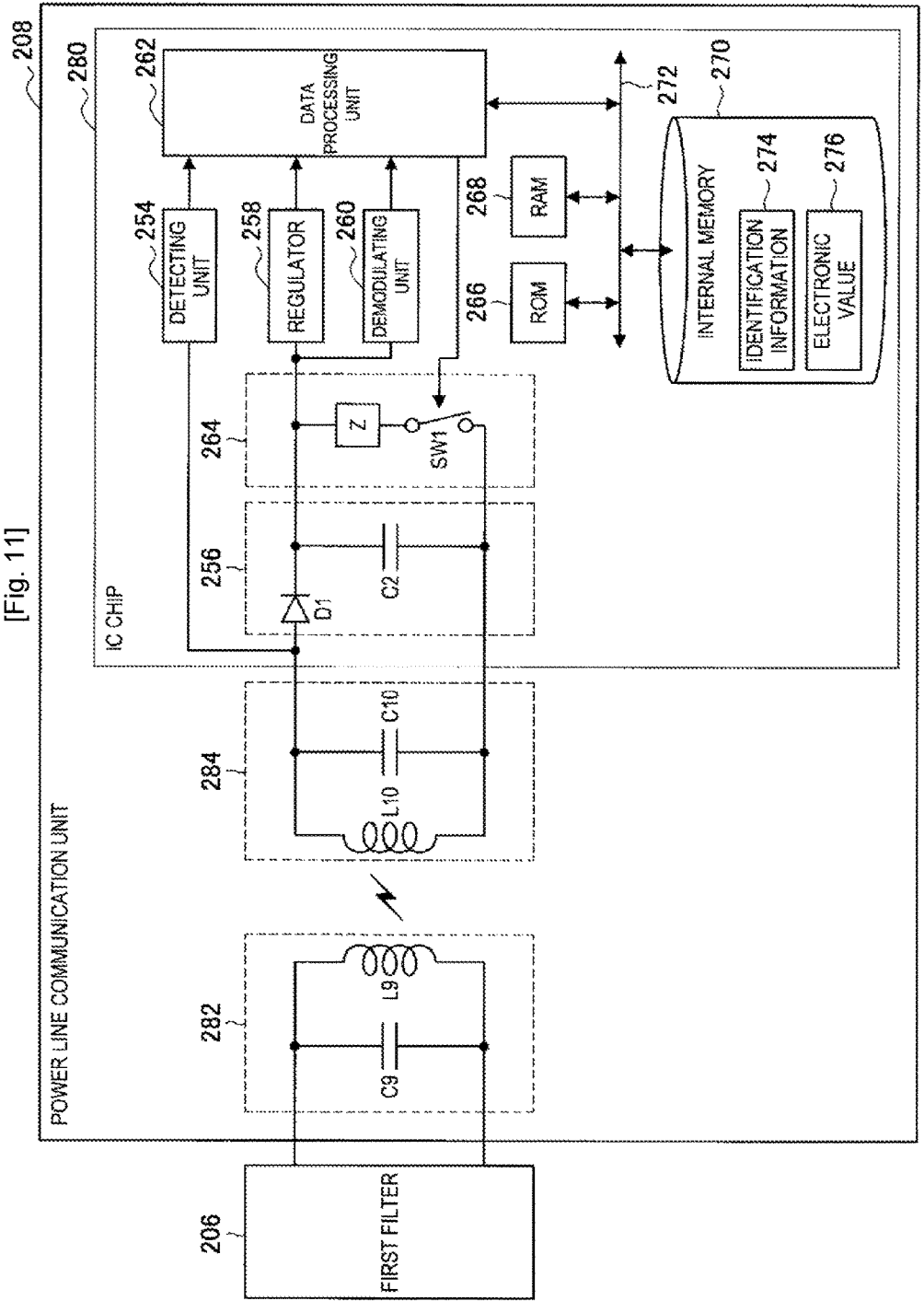

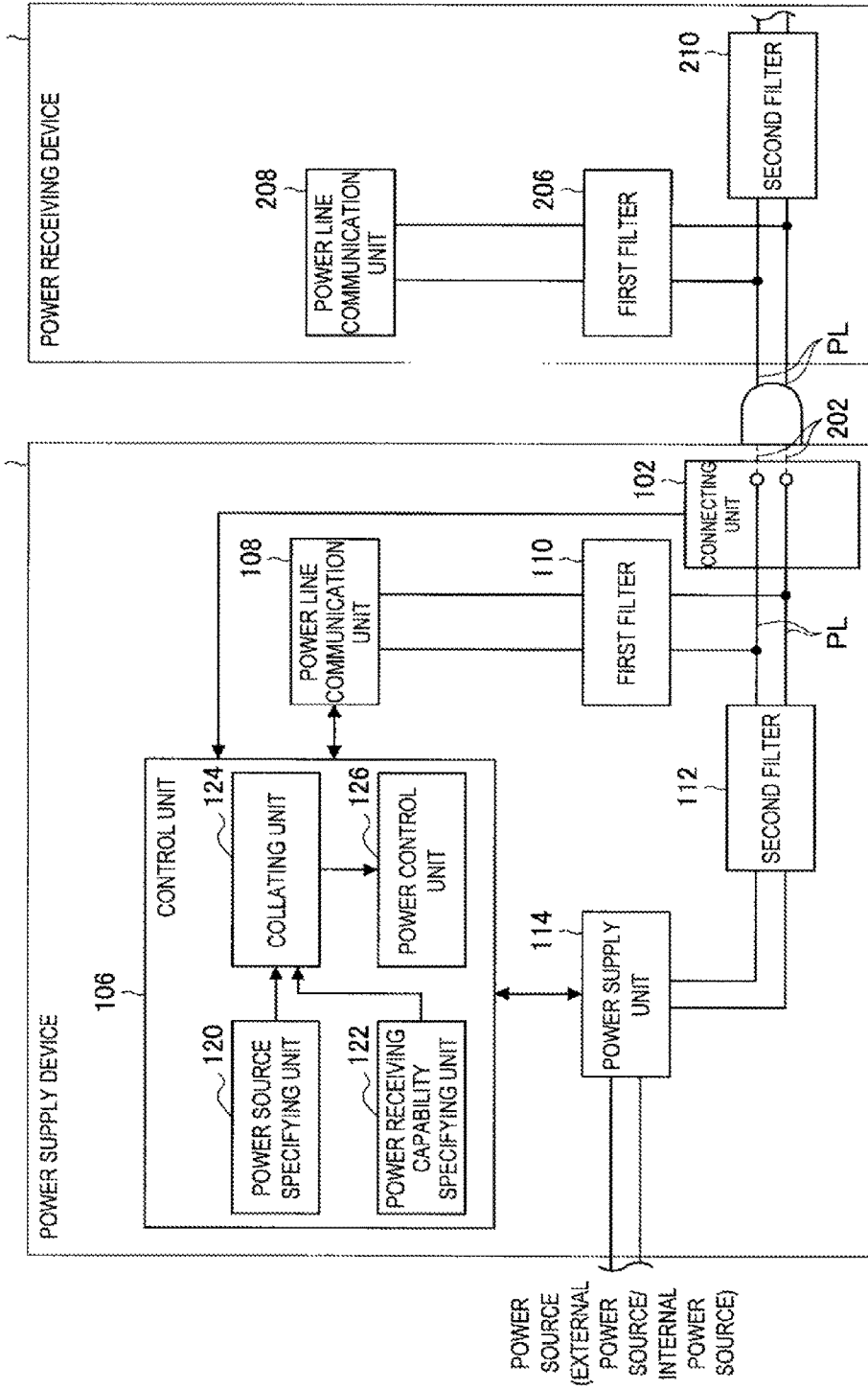
[Fig. 12]

[Fig. 13]
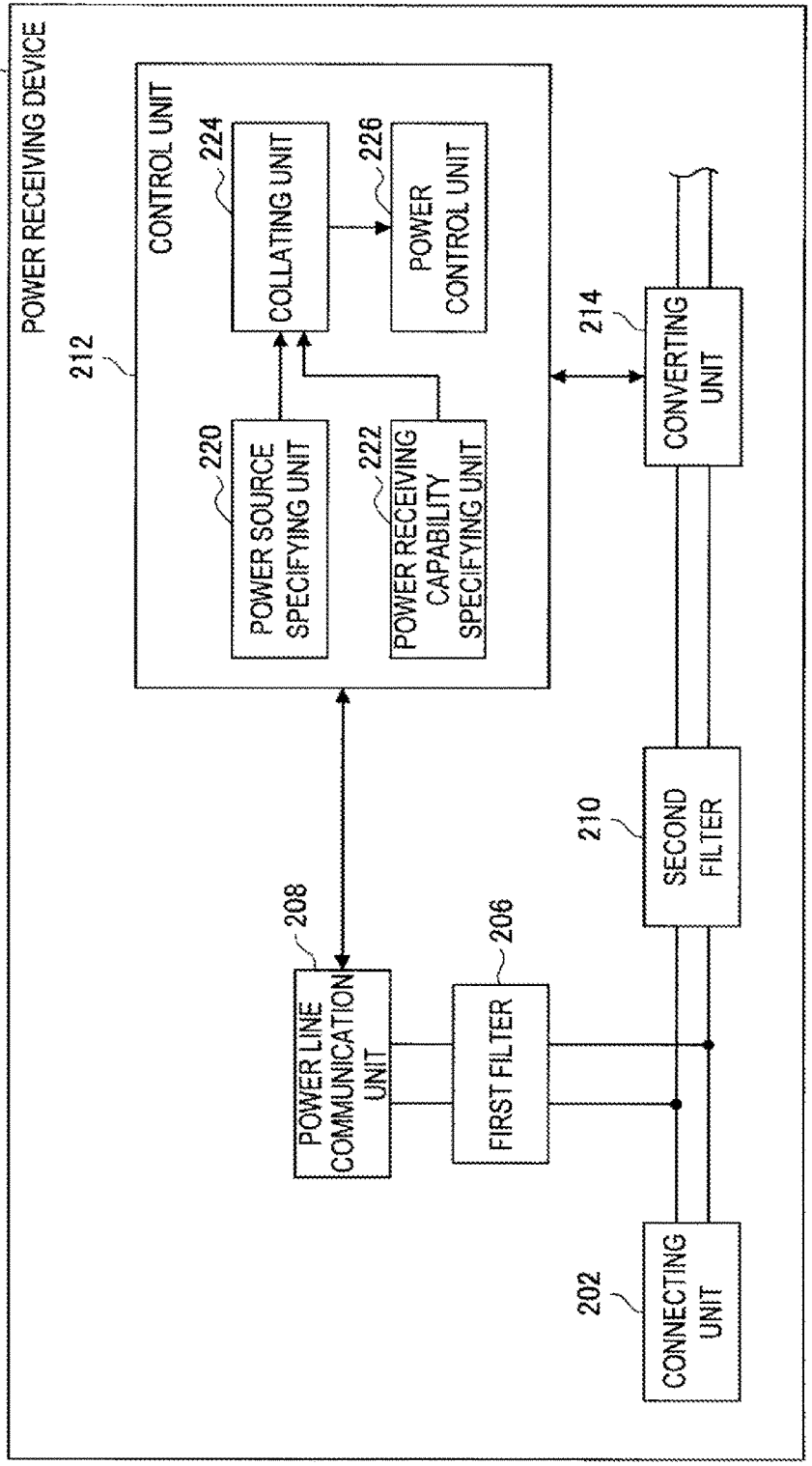

POWER SUPPLY DEVICE AND POWER RECEIVING DEVICE

TECHNICAL FIELD

The present disclosure relates to a power supply device, a power receiving device, a power supply method, a power receiving method, and a program.

The present application builds upon concepts disclosed in prior applications by one or more of the inventors and/or the assignee, including the following: Japan Patent Application No. 2012-060676, titled "ACCORDING TO THE ENERGY FORMAT INFORMATION RECEIVED FROM RECEIVER, CONTROL OUTPUT ENERGY," filed Mar. 16, 2012. The entire contents of each of the above-identified applications are hereby incorporated by reference.

BACKGROUND ART

A power receiving capability of a device (hereinafter referred to as a "power receiving device") that receives electric power is not constant in all power receiving devices and usually differs according to a power receiving device (for example, the type of power receiving device, a manufacturer, or a model). Further, as a power source that supplies electric power, there are various power sources such as a 100V power source and a 200V power source. For this reason, when electric power exceeding the power receiving capability of the power receiving device is supplied to the power receiving device, for example, an undesired situation in which the power receiving device is broken may occur.

In this regard, techniques of controlling transmission of electric power to a power receiving device have been developed. For example, a technique discussed in Patent Literature 1 has been proposed as a technique of invoking a state in which electric power can be transmitted to a power receiving device when a voltage of supplied electric power matches a previously set voltage.

CITATION LIST

Patent Literature

PTL 1: JP 2008-047410 A

SUMMARY

Technical Problem

For example, in the technique discussed in Patent Literature 1, when a voltage of supplied electric power matches a previously set voltage, a state in which electric power can be transmitted to a power receiving device is invoked. Thus, for example, when the technique discussed in Patent Literature 1 is used, it is possible to prevent electric power exceeding the power receiving capability of the power receiving device from being supplied to the power receiving device.

However, for example, when the technique discussed in Patent Literature 1 is used, electric power is not transmitted when a voltage of supplied electric power does not match a previously set voltage. Thus, for example, when the technique discussed in Patent Literature 1 is used, for example, although a power receiving device is connected to a device (a transmission side device; hereinafter referred to as a "power supply device") that supplies electric power such as an electrical outlet, electric power may not be transmitted, and thus the convenience of a user who desires transmission of electric power to a power receiving device is likely to be reduced.

The present disclosure is directed to propose a power supply device, a power receiving device, a power supply method, a power receiving method, and a program, which are new and novel and capable of causing a power receiving device to be received by electric power that does not exceed a power receiving capability of the power receiving device.

Solution to Problem

According to another embodiment of the present disclosure, there is provided a power supply device, including a power source specifying unit for specifying a type of a power source; a power receiving capability specifying unit for specifying a power receiving capability of a power receiving device; a collating unit for performing collation of the specified type of the power source with the specified power receiving capability; and a power control unit for controlling transmission of electric power from the power source of the specified type to the power receiving device based on the collation.

According to another embodiment of the present disclosure, there is provided a power supply method, including specifying a type of a power source; specifying a power receiving capability of a power receiving device; performing collation of the specified type of the power source with the specified power receiving capability; and controlling transmission of electric power from the power source of the specified type to the power receiving device based on the collation.

According to another embodiment of the present disclosure, there is provided a power receiving device, including a power source specifying unit for specifying a type of a power source; a power receiving capability specifying unit for specifying a power receiving capability of the power receiving device; a collating unit for performing collation of the specified type of the power source with the specified power receiving capability; and a power control unit for controlling selective conversion of electric power transmitted from the power source of the specified type to the power receiving device, the controlling based on the collation.

According to another embodiment of the present disclosure, there is provided a power receiving method, including specifying a type of a power source; specifying a power receiving capability of a power receiving device; performing collation of the specified type of the power source with the specified power receiving capability; and controlling, based on the collation, selective conversion of electric power transmitted from the power source of the specified type to the power receiving device.

According to another embodiment of the present disclosure, there is provided a power supply device, including a power source specifying unit for specifying a plurality of types of power sources; a power receiving capability specifying unit for specifying a power receiving capability of a power receiving device; a collating unit for performing collation of the plurality of specified types of power sources with the specified power receiving capability, and for selecting, from a plurality of power sources of the specified plurality of types, a power source that is configured to supply electric power that does not exceed the specified power receiving capability of the power receiving device; and a power control unit for controlling transmission of electric power from the selected power source to the power receiving device based on the collation.

According to another embodiment of the present disclosure, there is provided a power supply method, including specifying a plurality of types of power sources; specifying a power receiving capability of a power receiving device; performing collation of the plurality of specified types of power sources with the specified power receiving capability; selecting, from a plurality of power sources of the specified plurality of types, a power source that is configured to supply electric power that does not exceed the specified power receiving capability of the power receiving device; and controlling transmission of electric power from the selected power source to the power receiving device based on the collation.

Advantageous Effects of Some Embodiments of the Present Disclosure

According to the present disclosure, it is possible to cause electric power that does not exceed a power receiving capability of a power receiving device to be received by the power receiving device.

BRIEF DESCRIPTION OF DRAWINGS

FIG. 1 is a flowchart illustrating an example of a process related to power supply method in a power supply device according to the present embodiment.

FIG. 2 is a flowchart illustrating an example of a process related to power receiving method in a power receiving device according to the present embodiment.

FIG. 3 is an explanatory diagram for describing an example of wireless communication according to the present embodiment.

FIG. 4 is an explanatory diagram illustrating an example of a configuration for implementing wireless communication performed between a power supply device according to the present embodiment and a power receiving device according to the present embodiment.

FIG. 5 is an explanatory diagram for describing an example of power line communication of the present embodiment.

FIG. 6 is an explanatory diagram illustrating an example of a configuration of a power line communication unit arranged in a power supply device according to the present embodiment.

FIG. 7 is an explanatory diagram illustrating another example of a power line communication unit arranged in a power supply device according to the present embodiment.

FIG. 8 is an explanatory diagram illustrating an example of a configuration of a first filter arranged in a power supply device according to the present embodiment.

FIG. 9 is an explanatory diagram illustrating an example of a configuration of a second filter arranged in a power supply device according to the present embodiment.

FIG. 10 is an explanatory diagram illustrating an example of a configuration of a power line communication unit arranged in a power receiving device according to the present embodiment.

FIG. 11 is an explanatory diagram illustrating another example of a configuration of a power line communication unit arranged in a power receiving device according to the present embodiment.

FIG. 12 is an explanatory diagram illustrating an example of configurations of a power supply device according to the present embodiment.

FIG. 13 is an explanatory diagram illustrating an example of configurations of a power receiving device according to the present embodiment and a power receiving device according to the present embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will proceed in the following order.
1. Power Supply Method and Power Receiving Method According to Present Embodiment
2. Communication According to Present Embodiment
3. Power Supply Device According to Present Embodiment
4. Power Receiving Device According to Present Embodiment
5. Program According to Present Embodiment
(Power Supply Method and Power Receiving Method According to Present Embodiment)

Before describing configurations of a power supply device and a power receiving device according to the present embodiment, the power supply method and the power receiving method according to the present embodiment will be first described. In the following, the power supply method and the power receiving method according to the present embodiment will be described in connection with an example in which electric power is transmitted via a power line in a wired manner. The power supply method and the power receiving method according to the present embodiment are not limited to the example in which electric power is transmitted in a wired manner. For example, the power supply method and the power receiving method according to the present embodiment can be applied to cases in which electric power is transmitted in a wireless manner such as transmission of electric power using radio waves (microwaves), transmission of electric power using resonance of a magnetic field, and transmission of electric power using resonance of an electric field.

As described above, for example, when electric power is not transmitted even though a power supply device is connected to a power receiving device, the convenience of the user is likely to be reduced.

1. Power Supply Method in Power Supply Device According to Present Embodiment

In this regard, the power supply device according to the present embodiment specifies the type of power source that supplies electric power (a power source specifying process). Further, the power supply device according to the present embodiment specifies a power receiving capability of an external device of a power supply target such as an external device (which corresponds to a power receiving device and may hereinafter be referred to as an "external connection device") connected via a power line in a wired manner (a power receiving capability specifying process). Furthermore, the power supply device according to the present embodiment collates the specified type of power source and the specified power receiving capability (e.g., compares the specified type of power source and the specified power receiving capability) (a collating process), and transmits electric power corresponding to the external device of the power supply target based on a collation result (a power control process).

(1) Power Source Specifying Process

The power supply device according to the present embodiment specifies the type of power source. Here, examples of the type of power source according to the present embodiment include a voltage (for example, 100 [V] or 200 [V]) or a current of electric power, a kind (for example, a direct current or an alternating current) of electric current, an index related to electric power supplied from a power source such as a frequency of electric power, a standard (for example, a version of a standard may be included; the same applies hereinafter) of a power source, or an index representing a charging speed such as high-speed charging (fast charging) or normal charging.

More specifically, for example, the power supply device according to the present embodiment measures an index related to electric power supplied from a power source such as a voltage of electric power or a frequency of electric power supplied from a power source, and specifies the type of power source based on the measurement result. The power source specifying process in the power supply device according to the present embodiment is not limited to this example. For example, the power supply device according to the present embodiment may specify the type of power source based on power source type information representing the type of power source, which is transmitted to a power line in the form of a packet. Further, for example, the power supply device according to the present embodiment may perform communication with an external device such as a server (for example, a server of a power company) that manages a supplied power source, and specify the type of power source based on power source type information acquired from the external device.

The power supply device according to the present embodiment specifies the type of power source, for example, as described above, in the power source specifying process.

The power source specifying process in the power supply device according to the present embodiment is not limited to this example. For example, the power supply device according to the present embodiment may specify the type of power source based on an operation of the power supply device according to the present embodiment or a user operation. For example, when one or more selection buttons in which a supplied power source is associated with power source type information are pressed down by the user (for example, the user of the power supply device according to the present embodiment or the user of the external connection device) (when the user operation is performed), the type of power source may be specified based on the power source type information associated with the pressed button. In the power source specifying process, the type of power source is specified based on the user operation, and thus the power supply device according to the present embodiment can implement power transmission according to the user's need (for example, a shortest charging time and a fastest charging speed or a lowest charging cost).

(2) Power Receiving Capability Specifying Process

The power supply device according to the present embodiment specifies the power receiving capability of the external device of the power supply target such as the external connection device. For example, the power supply device according to the present embodiment performs communication with the external device of the power supply target, and specifies the power receiving capability of the external device of the power supply target based on information acquired from the external device of the power supply target through communication with the external device of the power supply target. Here, communication between the power supply device according to the present embodiment and the external device of the power supply target will be described later.

More specifically, the power supply device according to the present embodiment specifies the power receiving capability of the external device of the power supply target based on, for example, the power receiving capability information representing the power receiving capability of the external device of the power supply target or the identification information representing the external device of the power supply target.

Here, the power receiving capability information according to the present embodiment refers to information representing electric power which can be received by the external device (the power receiving device) of the power supply target, that is, electric power supported by the external device of the power supply target. For example, data representing an index related to electric power supported by the external device of the power supply target such as a voltage, a current, a kind of electric power, or a frequency, data representing a standard of a power source (for example, a version of a standard may be included), data representing an index representing a charging speed supported by the external device of the power supply target such as high-speed charging or normal charging may be used as the power receiving capability information according to the present embodiment. The power receiving capability information according to the present embodiment is not limited to the above examples as long as information specifies electric power which can be received by the external device of the power supply target.

The identification information according to the present embodiment refers to information used to identify the external device of the power supply target. For example, data representing an identification number specific to the external device of the power supply target, data representing the type of the external device of the power supply target (for example, data representing a manufacturer or a model number), or power waveform data representing a power waveform when the external device of the power supply target is used (when the external device of the power supply target is driven) may be used as the identification information according to the present embodiment. The identification information according to the present embodiment is not limited to the above examples as long as information is used to identify the external device of the power supply target.

For example, when the power receiving capability information is acquired from the external device of the power supply target, the power supply device according to the present embodiment specifies corresponding electric power represented by the power receiving capability information as electric power which can be received by the external device of the power supply target, that is, the power receiving capability of the external device of the power supply target.

Further, for example, when the identification information is acquired from the external device of the power supply target, the power supply device according to the present embodiment specifies the power receiving capability of the external device of the power supply target based on the identification information.

More specifically, for example, the power supply device according to the present embodiment acquires the power receiving capability information corresponding to the acquired identification information from the external device of the power supply target with reference to a table, in which identification information and power receiving capability information are recorded in association with each other, which is stored in a recording medium such as a storage unit (which will be described later). Then, the power supply device according to the present embodiment specifies corresponding electric power represented by the acquired power receiving capability information as the power receiving capability of the external device of the power supply target.

Further, for example, the power supply device according to the present embodiment may acquire power receiving capability information corresponding to identification information acquired from the external device of the power supply target from the external device such as the server, and specify corresponding electric power represented by the acquired power receiving capability information as the power receiving capability of the external device of the power supply target. Here, when the power receiving capability information is acquired from the external device, for example, the power supply device according to the present embodiment transmits a power receiving capability information transmission request including identification information and a transmission command of power receiving capability information to the external device. Further, for example, the external device that has received the power receiving capability information transmission request specifies the power receiving capability information corresponding to the identification information included in the power receiving capability information transmission request with reference to a database, a table, or the like, and transmits the specified power receiving capability information to the power supply device according to the present embodiment.

The power supply device according to the present embodiment specifies the power receiving capability of the external device of the power supply target, for example, as described above, in the power receiving capability specifying process.

The power receiving capability specifying process in the power supply device according to the present embodiment is not limited to the above example. For example, the power supply device according to the present embodiment may specify the power receiving capability of the external device of the power supply target based on the user operation. For example, when the identification number of the external device of the power supply target or the type of the external device of the power supply target is input (selected) by the user (for example, the user of the power supply device according to the present embodiment or the user of the external device of the power supply target) (an example in which the user operation is performed), the power receiving capability of the external device of the power supply target may be specified based on identification information acquired based on the user operation. Further, for example, when an index related to electric power supported by the external device of the power supply target, a standard of a power source, or the like is input (or selected) by the user (an example in which the user operation is performed), the power receiving capability of the external device of the power supply target may be specified based on power receiving capability information acquired based on the user operation.

(3) Collating Process

The power supply device according to the present embodiment collates the type of power source specified in the process (1) (the power source specifying process) with the power receiving capability specified in the process (2) (the power receiving capability specifying process).

More specifically, for example, the power supply device according to the present embodiment collates the specified type of power source with the specified power receiving capability, and determines (e.g., verifies) whether or not electric power supplied from a power source whose type is specified exceeds the specified power receiving capability of the external device of the power supply target.

Here, for example, the power supply device according to the present embodiment compares an index related to electric power supplied from a power source whose type is specified with an index related to electric power supported by the external device of the power supply target, and determines whether or not electric power supplied from a power source whose type is specified exceeds the specified power receiving capability of the external device of the power supply target. For example, when a voltage of electric power supplied from a power source is larger than a voltage supported by the external device of the power supply target (or when a voltage of electric power supplied from a power source is equal to or more than a voltage supported by the external device of the power supply target; the same applies hereinafter), the power supply device according to the present embodiment determines that electric power supplied from a power source whose type is specified exceeds the power receiving capability of the external device of the power supply target. Further, for example, when a voltage of electric power supplied from a power source is equal to or less than a voltage supported by the external device of the power supply target (or when a voltage of electric power supplied from a power source is smaller than a voltage supported by the external device of the power supply target; the same applies hereinafter), the power supply device according to the present embodiment determines that electric power supplied from a power source whose type is specified does not exceed the power receiving capability of the external device of the power supply target. In addition, for example, the power supply device according to the present embodiment may specify an index related to electric power based on a standard of a power source corresponding to a power source whose type is specified in the process (1) (the power source specifying process) or a standard of a power source corresponding to the external device of the power supply target specified in the process (2) (the power receiving capability specifying process). For example, the power supply device according to the present embodiment may specify an index related to electric power with reference to a table in which a standard of a power source is associated with an index related to electric power.

Further, for example, the power supply device according to the present embodiment may determine whether or not electric power supplied from a power source whose type is specified exceeds the specified power receiving capability of the external device of the power supply target based on a standard of a power source corresponding to a power source whose type is specified and a standard of a power source corresponding to the external device of the power supply target. For example, the power supply device according to the present embodiment determines whether or not electric power supplied from a power source whose type is specified exceeds the power receiving capability of the external device of the power supply target with reference to a table in which a combination of a standard of a power source is stored in association with a power reception possibility.

The collating process in the power supply device according to the present embodiment is not limited to the above example. For example, when a plurality of types of power sources are specified in the process (1) (the power source specifying process), the power supply device according to the present embodiment may collate the specified types of power sources with the specified power receiving capability (e.g., may compare the specified types of power sources with the specified power receiving capability), and select a power source that can supply electric power that does not exceed the specified power receiving capability of the external device of the power supply target from among a plurality of power sources whose types are specified.

More specifically, for example, the power supply device according to the present embodiment specifies (e.g., determines or verifies) whether or not the power receiving capability of the external device of the power supply target is exceeded on each of a plurality of power sources whose types are specified in the process (1) (the power source specifying process) as described above. Then, the power supply device according to the present embodiment selects a power source that can supply electric power that does not exceed the power receiving capability of the external device of the power supply target based on the determination result.

Here, when a plurality of power sources are present as a power source that can supply electric power that does not exceed the power receiving capability of the external device of the power supply target, for example, the power supply device according to the present embodiment selects a power source based on a priority of a set power source. For example, the priority may be a fixed value which is set in advance or a variable value which can be changed by the user.

In addition, a power source selecting method when a plurality of power sources are present as a power source that can supply electric power that does not exceed the power receiving capability of the external device of the power supply target is not limited to the above example. For example, the power supply device according to the present embodiment may select a power source that supplies electric power which is shortest (or substantially shortest) in power reception time in the external device of the power supply target or a power source that supplies electric power which is lowest (or substantially lowest) in cost paid by the user from among power sources that can supply electric power that does not exceed the power receiving capability of the external device of the power supply target. For example, the power supply device according to the present embodiment selects a power source based on data representing an index related to electric power such as a voltage of electric power corresponding to a power source or data representing the price (for example, a unit price such as a price per [kW]) of electric power supplied from a power source. For example, the power supply device according to the present embodiment acquires data representing an index related to electric power such as a voltage of electric power corresponding to a power source or data representing the price of electric power supplied from a power source from a recording medium such as a storage unit (which will be described later) or an external device such as a server.

(4) Power Control Process

For example, the power supply device according to the present embodiment causes electric power corresponding to the external device of the power supply target to be transmitted to the power supply unit (which will be described later) or the external device having the same function as the power supply unit (which will be described later) based on the collation result in the process (3) (the collating process). For example, the power supply device according to the present embodiment transmits a control signal corresponding to the collation result to the power supply unit (which will be described later) and thus causes the power supply unit (which will be described later) to transmit corresponding electric power to the external device of the power supply target.

More specifically, in the case in which a determination on whether or not the power receiving capability of the external device of the power supply target is exceeded is performed in the process (3) (the collating process), when the determination result which is the collation result does not represent that the power receiving capability is exceeded, for example, the power supply device according to the present embodiment causes the power supply unit (which will be described later) or the like to transmit electric power supplied from a power source whose type is specified.

Further, in the case in which a determination on whether or not the power receiving capability of the external device of the power supply target is exceeded is performed in the process (3) (the collating process), when the determination result which is the collation result represents that the power receiving capability is exceeded, for example, the power supply device according to the present embodiment causes the power supply unit (which will be described later) or the like to convert electric power supplied from a power source whose type is specified into electric power that does not exceed the specified power receiving capability. Then, the power supply device according to the present embodiment causes the power supply unit (which will be described later) or the like to transmit the converted electric power.

Here, for example, the power supply device according to the present embodiment may select electric power which is shortest (or substantially shortest) in power reception time in the external device of the power supply target or electric power which is lowest (or substantially lowest) in cost paid by the user from among convertible electric power that does not exceed the power receiving capability of the external device of the power supply target, and convert electric power supplied from a power source whose type is specified into the selected electric power. For example, the power supply device according to the present embodiment selects the converted electric power based on data representing an index related to electric power such as a voltage of converted electric power or data representing the price (for example, a unit price such as a price per [kWh]) of converted electric power. For example, the power supply device according to the present embodiment acquires data representing an index related to electric power or data representing the price of electric power from a recording medium such as a storage unit (which will be described later) or an external device such as a server.

Further, when a determination on whether or not the power receiving capability of the external device of the power supply target is exceeded in the process (3) (the collating process), for example, a signal including a command representing the presence or absence of conversion or a signal including a command representing the presence or absence of conversion and a command representing conversion content may be used as the control signal that the power supply device according to the present embodiment transfers to the power supply unit (which will be described later) or the like.

Further, for example, when selection of a power source that can supply electric power that does not exceed the power receiving capability of the external device of the power supply target is performed in the process (3) (the collating process), for example, the power supply device according to the present embodiment causes the power supply unit (which will be described later) to transmit electric power supplied from the selected power source based on the power source selection result which is the collation result. Here, when selection of a power source that can supply electric power that does not exceed the power receiving capability of the external device of the power supply target is performed in the process (3) (the collating process), a signal used to control a switch for switching a power source, which is arranged in the power supply unit (which will be described later), may be used as a control signal that the power supply device according to the present embodiment transfers to the power supply unit (which will be described later) or the like.

The power supply device according to the present embodiment transmits corresponding electric power to the external device of the power supply target in the power control process as described above.

The power control process in the power supply device according to the present embodiment is not limited to the above example. For example, when it is difficult to transmit corresponding electric power to the external device of the power supply target due to the function of the power supply unit (which will be described later) or the like, the power supply device according to the present embodiment does not transmit electric power to the external device of the power supply target (an exceptional process). For example, the power supply device according to the present embodiment transfers the control signal to the power supply unit (which will be described later) and thus controls transmission of electric power to the external device of the power supply target.

As the exceptional process is performed as described above, electric power that exceeds the power receiving capability of the external device (power receiving device) of the power supply target can be prevented from being supplied to the external device of the power supply target. Thus, as the exceptional process is performed as described above, for example, the power supply device according to the present embodiment can prevent the occurrence of an undesired situation in which the external device of the power supply target is broken.

Further, when electric power is caused not to be transmitted to the external device of the power supply target, for example, the power supply device according to the present embodiment may notify the user of the external device of the power supply target of the fact that electric power is not transmitted (an example of an exceptional notice). For example, the power supply device according to the present embodiment may give a notice to the user of the external device of the power supply target by a visual notice method using text, an image, or the like or an acoustical notice method using a sound (including music or a beep sound; the same applies hereinafter). Here, for example, the power supply device according to the present embodiment may give a notice through a display unit (which will be described later) arranged in an own device (the power supply device according to the present embodiment), the external display device, an external device such as the external device of the power supply target, or the like.

For example, the power supply device according to the present embodiment performs the process (1) (the power source specifying process) to the process (4) (the power control process) as the process related to the power supply method according to the present embodiment. Here, the power supply device according to the present embodiment transmits corresponding electric power to the external device (the power receiving device) of the power supply target based on the collation result of the process (3) (the collating process) in the process (4) (the power control process) (the principle processing). Further, the power supply device according to the present embodiment performs the process (3) (the collating process) based on the result of the process (1) (the power source specifying process) and the result of the process (2) (the power receiving capability specifying process). Thus, electric power that the power supply device according to the present embodiment transmits to the external device of the power supply target through the process (4) (the power control process) corresponds to the external device of the power supply target.

Thus, the power supply device according to the present embodiment can cause electric power that does not exceed the power receiving capability of the power receiving device to be received by the power receiving device by performing the process (1) (the power source specifying process) to the process (4) (the power control process) as the process related to the power supply method according to the present embodiment.

Further, the power supply device according to the present embodiment performs the process (1) (the power source specifying process) to the process (4) (the power control process), and thus, for example, the situation in which electric power is not transmitted even though the power receiving device is connected to the power supply device is prevented. Thus, the power supply device according to the present embodiment performs, for example, the process (1) (the power source specifying process) to the process (4) (the power control process), and thus the user's convenience can be improved.

FIG. 1 is a flowchart illustrating an example of a process related to the power supply method in the power supply device according to the present embodiment. Here, the process of step S100 illustrated in FIG. 1 corresponds to the process (1) (the power source specifying process), and the process of step S102 illustrated in FIG. 1 corresponds to the process (2) (the power receiving capability specifying process). Further, the process of steps S104, S106, S110, and S112 illustrated in FIG. 1 corresponds to the process (3) (the collating process), and the process of steps S108 and S114 illustrated in FIG. 1 corresponds to the process (4) (the power control process).

The power supply device according to the present embodiment specifies the type of power source (S100). For example, the power supply device according to the present embodiment specifies the type of power source based on, for example, the measurement of an index related to electric power supplied from a power source, the power source type information acquired though the power line, the power source type information acquired by communication with the external device, or the like.

The power supply device according to the present embodiment specifies the power receiving capability of the external device (power receiving device) of the power supply target (S102). For example, the power supply device according to the present embodiment performs communication with the external device of the power supply target, and specifies the power receiving capability of the external device of the power supply target based on information acquired from the external device of the power supply target by communication with the external device of the power supply target.

In FIG. 1, the process of step S100 is performed before the process of step S102 is performed. However, the power supply device according to the present embodiment may perform the process of step S100 and the process of step S102 independently of each other. Thus, for example, the power supply device according to the present embodiment may perform the process of step S102 before performing the process of step S100 or may perform the process of step S100 and the process of step S102 at the same time.

Here, when the process of steps S100 and S102 is completed, the power supply device according to the present embodiment collates the specified type of power source with the specified power receiving capability (S104).

The power supply device according to the present embodiment determines whether or not the collation result in the process of step S104 is normal (S106). For example, when it is determined that electric power supplied from a power source whose type is specified does not exceed the specified power receiving capability of the external device of the power supply target, the power supply device according to the present embodiment determines that the collation result is normal. However, when it is determined that electric power supplied from a power source whose type is specified exceeds the specified power receiving capability of the external device of the power supply target, the power supply device according to the present embodiment determines that the collation result is not normal.

Here, when it is determined in step S106 that the collation result is not normal, the power supply device according to the present embodiment converts electric power supplied from a power source (S108). Then, the power supply device according to the present embodiment transmits the converted electric power to the external device of the power supply target (S114). For example, the power supply device according to the present embodiment performs the process of steps S108 and S114 by transferring the control signal to the power supply unit (which will be described later) or the like.

However, when it is determined in step S106 that the collation result is normal, the power supply device according to the present embodiment determines whether or not a plurality of power sources are present as a power source whose type is specified in step S100 (S110).

Here, when it is determined in step S110 that a plurality of power sources are not present, the power supply device according to the present embodiment transmits electric power supplied from a power source to the external connection device (S114). For example, the power supply device according to the present embodiment performs the process of step S114 by transferring the control signal to the power supply unit (which will be described later) or the like.

However, when it is determined in step S110 that a plurality of power sources are present, the power supply device according to the present embodiment selects a power source that can supply electric power that does not exceed the specified power receiving capability of the external device of the power supply target from among a plurality of power sources whose type is specified (S112). Then, the power supply device according to the present embodiment transmits the electric power supplied from a power source selected in step S112 to the external device of the power supply target (S114). For example, the power supply device according to the present embodiment performs the process of step S114 by transferring the control signal to the power supply unit (which will be described later) or the like.

For example, the power supply device according to the present embodiment performs the process illustrated in FIG. 1 as the process related to the power supply method. Through the process illustrated in FIG. 1, the process (1) (the power source specifying process) to the process (4) (the power control process) are implemented. Thus, for example, by performing the process illustrated in FIG. 1, the power supply device according to the present embodiment can cause electric power that does not exceed the power receiving capability of the power receiving device to be received by the power receiving device. Further, for example, by performing the process illustrated in FIG. 1, the power supply device according to the present embodiment can improve the user's convenience.

The process related to the power supply method in the power supply device according to the present embodiment is not limited to the process illustrated in FIG. 1. For example, the power supply device according to the present embodiment may perform the exceptional process described above.

More specifically, for example, when it is determined in step S106 illustrated in FIG. 1 that the collation result is not normal, the power supply device according to the present embodiment further determines whether or not it is possible to transmit corresponding electric power to the external device of the power supply target. For example, when there is no power source that supplies corresponding electric power to the external device of the power supply target or when it is difficult for the power supply unit (which will be described later) or the like to perform conversion to electric power corresponding to the external device of the power supply target (for example, a capability required for conversion of electric power supplied from a power source exceeds a conversion capability in the power supply unit (which will be described later) or the like, the power supply device according to the present embodiment determines that it is difficult to transmit corresponding electric power to the external device of the power supply target.

Here, when it is determined that it is possible to transmit corresponding electric power to the external device of the power supply target, the power supply device according to the present embodiment performs the process of step S108 illustrated in FIG. 1. However, when it is determined that it is difficult to transmit corresponding electric power to the external device of the power supply target, the power supply device according to the present embodiment does not transmit electric power to the external device of the power supply target.

Further, for example, the power supply device according to the present embodiment may perform the authentication process of performing authentication on the external device of the power supply target, and selectively transmit electric power to the external device of the power supply target based on the authentication result.

More specifically, for example, the power supply device according to the present embodiment performs authentication on the external device of the power supply target based on identification information acquired by communication with the external device of the power supply target. For example, the power supply device according to the present embodiment performs authentication on the external device of the power supply target based on whether or not identification information corresponding to the identification information acquired from the external device of the power supply target remains stored in a database in which the identification information representing the external device that is allowed to be supplied with electric power is recorded. Here, the database may be stored in a recording medium such as a storage unit (which will be described later), and the power supply device according to the present embodiment may acquire the database from the external device such as the server.

Here, when it is determined that the external device of the power supply target has been authenticated normally, the power supply device according to the present embodiment performs the process of step S104 illustrated in FIG. 1.

However, when it is determined that the external device of the power supply target has not been authenticated normally, the power supply device according to the present embodiment does not transmit electric power to the external device of the power supply target.

2. Power Receiving Method in Power Receiving Device According to Present Embodiment Next, the power receiving method in the power receiving device according to the present embodiment will be described. For example, the power receiving device according to the present embodiment specifies the type of power source that supplies electric power to be transmitted such as a power source that supplies electric power to be transmitted through the power line used to transmit electric power (the power source specifying process). Further, the power receiving device according to the present embodiment specifies the power receiving capability of its own device (the power receiving device according to the present embodiment) (the power receiving capability specifying process). Then, the power receiving device according to the present embodiment collates the specified type of power source with the specified power receiving capability (e.g., compares the specified type of power source and the specified power receiving capability) (the collating process), and causes corresponding electric power to be received by its own device based on the collation result (the power control process).

(I) Power Source Specifying Process

The power receiving device according to the present embodiment specifies the type of power source that supplies electric power to be transmitted via the power line or wirelessly. More specifically, for example, the power receiving device according to the present embodiment specifies the type of power source based on a measurement result of an index related to electric power to be transmitted, the power source type information acquired through the power line, the power source type information acquired by communication with the external device such as the server or the power supply device, or the like, similarly to the process (1) (the power source specifying process) in the power supply device according to the present embodiment. Here, communication between the power receiving device and the power supply device according to the present embodiment will be described later.

(II) Power Receiving Capability Specifying Process

The power receiving device according to the present embodiment specifies the power receiving capability of its own device. For example, the power receiving device according to the present embodiment specifies the power receiving capability of its own device based on the power receiving capability information representing the power receiving capability of the own device, which is stored in the recording medium or the identification information representing the own device, similarly to the process (2) (the power receiving capability specifying process) in the power supply device according to the present embodiment.

(III) Collating Process

The power receiving device according to the present embodiment collates the type of power source specified in the process (I) (the power source specifying process) with the power receiving capability specified in the process (II) (the power receiving capability specifying process). For example, the power receiving device according to the present embodiment collates the specified type of power source with the specified power receiving capability by determining whether or not electric power supplied from a power source whose type is specified exceeds the specified power receiving capability of the external connection device, similarly to the process (3) (the collating process) in the power supply device according to the present embodiment.

(IV) Power Control Process

For example, the power receiving device according to the present embodiment causes corresponding electric power to be received by the own device based on the collation result in the process (III) (the collating process).

More specifically, for example, the power receiving device according to the present embodiment causes corresponding electric power to be received by the own device by causing a converting unit (which will be described later) that selectively converts electric power to be transmitted via the power line or an external device having the same function as the converting unit (which will be described later) to perform selective conversion of electric power. For example, the power receiving device according to the present embodiment causes the converting unit (which will be described later) or the like to perform selective conversion of electric power by transferring a control signal corresponding to the collation result to the converting unit (which will be described later) or the like.

For example, when the determination result which is the collation result does not represent that the power receiving capability is exceeded, the power receiving device according to the present embodiment does not cause the converting unit (which will be described later) or the like to convert electric power to be transmitted via the power line. Thus, in this case, the power receiving device according to the present embodiment is supplied with electric power transmitted via the power line.

Further, when the determination result which is the collation result represents that the power receiving capability is exceeded, the power receiving device according to the present embodiment causes the converting unit (which will be described later) or the like to convert electric power transmitted via the power line into electric power that does not exceed the specified power receiving capability. Thus, in this case, the power receiving device according to the present embodiment is supplied with electric power converted by the converting unit (which will be described later) or the like.

Here, for example, a signal including a command representing the presence or absence of conversion or a signal including a command representing the presence or absence of conversion and a command representing conversion content may be used as the control signal that the power receiving device according to the present embodiment transfers to the converting unit (which will be described later) or the like.

The power receiving device according to the present embodiment causes corresponding electric power to be received by the own device in the power control process, for example, as described above.

The power control process in the power receiving device according to the present embodiment is not limited to the above example. For example, when it is determined that it is difficult to cause corresponding electric power to be received by the power receiving device according to the present embodiment due to the function of the converting unit (which will be described later) or the like, the power receiving device according to the present embodiment is not supplied with electric power (the exceptional process). For example, the power receiving device according to the present embodiment controls power reception in the own device by transferring a control signal to the converting unit (which will be described later) or the like.

As the above-described exceptional process is performed, it is possible to prevent electric power that exceeds the power receiving capability of the power receiving device according to the present embodiment from being supplied. Thus, as the above-described exceptional process is performed, for example, the power receiving device according to the present embodiment can prevent the occurrence of the undesired situation in which the power receiving device according to the present embodiment is broken.

Further, when power reception is not performed, for example, the power receiving device according to the present embodiment may notify the user of the own device of the fact that electric power is not received (an example of an exceptional notice). For example, the power receiving device according to the present embodiment may give a notice to the user of the own device by the visual notice method, the acoustical notice method, or the like. Here, the power supply device according to the present embodiment may give a notice through a display unit (which will be described later) arranged in the own device (the power receiving device according to the present embodiment), the external device such as the external display device, or the like.

The power receiving device according to the present embodiment performs, for example, the process (I) (the power source specifying process) to the process (IV) (the power control process) as the process related to the power receiving method according to the present embodiment. Here, the power supply device according to the present embodiment causes corresponding electric power to be received by the own device based on the collation result of the process (III) (the collating process) in the process (IV) (the power control process) (the principle processing). Further, the power receiving device according to the present embodiment performs the process (III) (the collating process) based the result of the process (I) (the power source specifying process) and the result of the process (II) (the power receiving capability specifying process). Thus, electric power with which the power receiving device according to the present embodiment is supplied through the process (IV) (the power control process) corresponds to the power receiving device according to the present embodiment.

Thus, the power receiving device according to the present embodiment can perform, for example, the process (I) (the power source specifying process) to the process (IV) (the power control process) as the process related to the power receiving method according to the present embodiment, and cause electric power that does not exceed the power receiving capability of the own device to be received.

Further, the power receiving device according to the present embodiment performs the process (I) (the power source specifying process) to the process (IV) (the power control process), and can prevent, for example, the situation in which electric power is not transmitted even though the power receiving device is connected to the power supply device. Thus, the power receiving device according to the present embodiment performs, for example, the process (I) (the power source specifying process) to the process (IV) (the power control process), and thus the user's convenience can be improved.

FIG. 2 is a flowchart illustrating an example of a process related to the power receiving method in the power receiving device according to the present embodiment. Here, the process of step S200 illustrated in FIG. 2 corresponds to the process (I) (the power source specifying process), and the process of step S202 illustrated in FIG. 2 corresponds to the process (II) (the power receiving capability specifying process). Further, the process of steps S204 and S206 illustrated in FIG. 2 corresponds to the process (III) (the collating process), and the process of steps S208 and S210 illustrated in FIG. 2 corresponds to the process (IV) (the power control process).

The power receiving device according to the present embodiment specifies the type of power source, similarly to step S100 illustrated in FIG. 1 (S200).

The power receiving device according to the present embodiment specifies the power receiving capability of the own device (S202). For example, the power receiving device according to the present embodiment specifies the power receiving capability of the own device based on the power receiving capability information or the identification information which is stored in the recording medium.

In FIG. 2, the process of step S200 is performed before the process of step S202 is performed. However, the power receiving device according to the present embodiment may perform the process of step S200 and the process of step S202 independently of each other. Thus, for example, the power receiving device according to the present embodiment may perform the process of step S202 before the process of step S200 is performed or may perform the process of step S200 and the process of step S202 at the same time.

Here, when the process of steps S200 and S202 is completed, the power receiving device according to the present embodiment collates the specified type of power source with the specified power receiving capability, similarly to step S104 illustrated in FIG. 1 (S204).

In the process of step S204, the power receiving device according to the present embodiment determines whether or not the collation result is normal, similarly to step S106 illustrated in FIG. 1 (S206).

Here, when it is determined in step S206 that the collation result is not normal, the power receiving device according to the present embodiment converts electric power to be transmitted (S208). However, when it is determined in step S206 that the collation result is normal, the power receiving device according to the present embodiment does not convert electric power to be transmitted (S210). For example, the power receiving device according to the present embodiment performs the process of steps S208 and 210 by transferring a control signal to the converting unit (which will be described later) or the like.

The power receiving device according to the present embodiment performs, for example, the process illustrated in FIG. 2 as the process related to the power receiving method. Through the process illustrated in FIG. 2, the process from (I) (the power source specifying process) to (IV) (the power control process) are implemented. Thus, for example, as the process illustrated in FIG. 2 is performed, the power receiving device according to the present embodiment can cause electric power that does not exceed the power receiving capability of the own device to be received. Further, for example, as the process illustrated in FIG. 2 is performed, the power receiving device according to the present embodiment can improve the user's convenience.

The process related to the power supply method in the power receiving device according to the present embodiment is not limited to the process illustrated in FIG. 2. For example, the power receiving device according to the present embodiment may perform the above-described exceptional process.

More specifically, for example, when it is determined in step S206 of FIG. 2 that the collation result is not normal, the power receiving device according to the present embodiment further determines (e.g., verifies) whether or not it is possible to cause corresponding electric power to be received by the power receiving device according to the present embodiment. For example, when it is difficult for the converting unit (which will be described later) or the like to perform conversion to electric power corresponding to the power receiving device according to the present embodiment (for example, when a capability required for conversion of electric power to be transmitted exceeds a conversion capability in the converting unit (which will be described later) or the like), for example, the power receiving device according to the present embodiment determines that it is difficult to cause corresponding electric power to be received by the power receiving device according to the present embodiment.

Here, when it is determined that it is possible to cause corresponding electric power to be received by the power receiving device according to the present embodiment, the power receiving device according to the present embodiment performs the process of step S208 illustrated in FIG. 2. However, when it is determined that it is difficult to cause corresponding electric power to be received by the power receiving device according to the present embodiment, the power receiving device according to the present embodiment does not perform power reception.

Further, for example, the power receiving device according to the present embodiment may perform the authentication process of performing authentication on the power supply device, and may be selectively supplied with electric power to be transmitted.

More specifically, the power receiving device according to the present embodiment performs authentication on the power supply device based on identification information corresponding to the power supply device, which is acquired by communication with the power supply device. For example, the power receiving device according to the present embodiment performs authentication on the power supply device based on whether or not identification information corresponding to the acquired identification information remains stored in a database in which the identification information representing the power supply device that transmits electric power allowed to be received is recorded. Here, the database may be stored in a recording medium such as a storage unit (which will be described later), and the power receiving device according to the present embodiment may acquire the database from the external device such as the server.

Here, when it is determined that the power supply device has been authenticated normally, the power receiving device according to the present embodiment performs the process of step S204 illustrated in FIG. 2. However, when it is determined that the power supply device has not been authenticated normally, the power receiving device according to the present embodiment does not receive electric power to be transmitted.

(Communication According to Present Embodiment)

Next, communication performed between the power supply device and the power receiving device (the external device of the power supply target when seen from the power supply device) will be described in connection with the process related to the power supply method according to the present embodiment and the process related to the power receiving method according to the present embodiment. In the following, communication according to the present embodiment will be described in connection with an example in which the power supply device according to the present embodiment performs communication with the power receiving device according to the present embodiment. Further, in the following, communication according to the present embodiment will be described in connection with an example in which the power supply device according to the present embodiment is connected with the power receiving device according to the present embodiment via the power line, that is, when electric power is transmitted via the power line in a wired manner.

For example, wireless communication or power line communication (wired communication) may be performed as communication between the power supply device according to the present embodiment and the power receiving device according to the present embodiment.

For example, wireless communication is performed between the power supply device according to the present embodiment and the power receiving device according to the present embodiment using a wireless communication technique such as a communication technique by a Near Field Communication (NFC) or Radio Frequency Identification (RFID) technique. Further, power line communication is performed between the power supply device according to the present embodiment and the power receiving device according to the present embodiment, for example, such that the wireless communication technique such as the communication technique by the NFC or RFID technique is applied to wired communication. Here, examples of the power line communication of the present embodiment include communication (so-called contact communication) performed between terminal of devices coming in contact with each other and communication performed when terminals of devices are connected to each other in a wired manner.

For example, the power supply device according to the present embodiment includes a high-frequency signal generating unit (which will be described later) that generates a high-frequency signal, and transmits the high-frequency signal to the external connection device. In other words, the power supply device according to the present embodiment has, for example, a so-called reader/writer function.

Further, the power receiving device according to the present embodiment, for example, performs communication with the external device by performing load modulation based on a signal transmitted from the external device such as the power supply device according to the present embodiment. For example, when the power receiving device according to the present embodiment receives the high-frequency signal transmitted from the power supply device according to the present embodiment, the power receiving device is driven by power obtained from the received high-frequency signal, performs the load modulation based on a result of processing the received high-frequency signal, and thus transmits the high-frequency signal.

For example, as the power supply device according to the present embodiment and the power receiving device according to the present embodiment perform the above-described processes, respectively, the wireless communication according to the present embodiment or the power line communication of the present embodiment is implemented between the power supply device according to the present embodiment and the power receiving device according to the present embodiment.

Here, examples of the high-frequency signal according to the present embodiment include a frequency signal used in RFID and a frequency signal used in non-contact communication. Examples of the frequency of the high-frequency signal include 130 to 135 [kHz], 13.56 [MHz], 56 [MHz], 433 [MHz], 954.2 [MHz], 954.8 [MHz], 2441.75 [MHz], and 2448.875 [MHz], but the frequency of the high-frequency signal according to the present embodiment is not limited to the above examples. In the following, a high frequency transmitted based on the high-frequency signal according to the present embodiment may be referred to as a "carrier wave."

The wireless communication according to the present embodiment and the power line communication of the present embodiment are not limited to the communication using the wireless communication technique such as the communication technique by the NFC or the RFID technique. For example, a wireless communication of an arbitrary scheme such as wireless communication based on IEEE802.11b or power line communication such as PLC (Power Line Communication or power line carrier communication) may be performed between the power supply device according to the present embodiment and the power receiving device according to the present embodiment. In the following, the communication according to the present embodiment will be described in connection with an example in which communication using the wireless communication technique such as the communication technique by the NFC or RFID technique is performed between the power supply device according to the present embodiment and the power receiving device according to the present embodiment.

1. Wireless Communication According to Present Embodiment

First, the wireless communication according to the present embodiment will be described. FIG. 3 is an explanatory diagram for describing an example of the wireless communication according to the present embodiment. In the following, the wireless communication according to the present embodiment will be described using a power supply device 100A and a power receiving device 200A illustrated in FIG. 3 as an example. In addition, FIG. 3 illustrates structural elements related to the wireless communication according to the present embodiment in a configuration of the power supply device according to the present embodiment and a configuration of the power receiving device according to the present embodiment. Further, FIG. 3 illustrates a plug as the power receiving device 200A, but the power receiving device according to the present embodiment is not limited to the plug.

For example, the power supply device 100A includes a connecting unit 102, a wireless communication unit 104, and a control unit 106. Further, for example, the power receiving device 200A includes a connecting unit 202 and a wireless communication unit 204.

The connecting unit 102 connects a power line PL through which power is transmitted to an external device. Further, the connecting unit 102 may include a connection supporting member that supports the maintenance of a connection state of the connected external device. Here, a power line through which an alternating current (AC) having a predetermined frequency such as 50 [Hz] or 60 [Hz] or a direct current (DC) flows may be used as the power line PL according to the present embodiment. Further, for example, a magnet may be used as the connection supporting member according to the present embodiment. In the following, the description will proceed in connection with an example in which an AC current having a predetermined frequency flows through the power line PL.

More specifically, the connecting unit 102 has a terminal connected to the power line PL, and the connecting unit 202 has a terminal connected to the power line PL (which corresponds to an external power line when seen from the power supply device 100A). Further, when the terminal of the connecting unit 102 is electrically connected to the terminal of the connecting unit 202, the power supply device 100A is connected to the power receiving device 200A (which corresponds to an external device when seen from the power supply device 100A). Here, an "electrical connection between the terminal of the connecting unit 102 and the terminal of the connecting unit 202" according to the present embodiment refers to, for example, a contact between the connecting units of the devices or a wired connection between the connecting units of the devices. In addition, the connecting unit 202 may include a connection supporting member that supports the maintenance of a connection state of the connected external device, similarly to the connecting unit 102 of the power supply device 100A.

For example, the connecting unit 102 detects a change in the connection state of the external device (a change from the non-connection state to the connection state or a change from the connection state to the non-connection state). Then, the connecting unit 102 transfers a detection signal representing the detection (detection result) to the control unit 106. In addition, when the wireless communication unit 104 has a function of transmitting the high-frequency signal in response to the transfer of the detection signal, the connecting unit 102 may transfer the detection signal to the wireless communication unit 104. Further, the connecting unit 102 may transmit the detection signal to, for example, a power supply unit (later described) that the power supply device according to the present embodiment includes.

Here, for example, the connecting unit 102 includes a switch of detecting a physical connection state of the external device, and transfers the detection signal to the control unit 106, or the like, when a state of the switch changes. However, a configuration of the connecting unit 102 is not limited to this example. In addition, when the power supply device 100A is configured to transmit the high-frequency signal at regular intervals or irregular intervals, for example, the connecting unit 102 according to the present embodiment may be configured not to have a function of detecting a change in the connection state of the external device.

The wireless communication unit 104 and the wireless communication unit 204 undertake the wireless communication according to the present embodiment. Further, for example, the communication in the wireless communication unit 104 is controlled by the control unit 106.

The control unit 106 is constituted by a Micro Processing Unit (MPU) or an integrated circuit (IC) in which various kinds of processing circuits are integrated, and controls the components of the power supply device 100A. More specifically, for example, the control unit 106 transfers a high-frequency signal generation command or a high-frequency signal transmission stop command to a power line communication unit 108 based on the detection signal transferred from the connecting unit 102 or a response signal of the external connection device such as a power receiving device 200A transferred from the power line communication unit 108, and controls the communication in the power line communication unit 108.

Further, the control unit 106 actively undertakes the process (for example, the processes from (1) (the power source specifying process) to (4) (the power control process)) related to the power supply method according to the present embodiment. In the control unit 106 of the power supply device according to the present embodiment, a configuration for implementing the process related to the power supply method according to the present embodiment will be described later.

FIG. 4 is an explanatory diagram illustrating an example of a configuration for implementing wireless communication performed between the power supply device according to the present embodiment and the power receiving device according to the present embodiment. Here, FIG. 4 illustrates an example of configurations of the wireless communication unit 104 and the control unit 106 arranged in the power supply device 100A illustrated in FIG. 3 and the wireless communication unit 204 arranged in the power receiving device 200A illustrated in FIG. 3.

1-1. Wireless Communication Unit 104 Arranged in Power Supply Device According to Present Embodiment For example, the wireless communication unit 104 includes a high-frequency signal generating unit 150, a high-frequency transmitting unit 152, and a demodulating unit 154. For example, the wireless communication unit 104 transmits the high-frequency signal in response to the high-frequency signal generation command transferred from the control unit 106, and stops transmission of the high-frequency signal in response to the high-frequency signal transmission stop command transferred from the control unit 106.

The wireless communication unit 104 may include, for example, an encryption circuit (not shown) for encrypting communication, a communication anti-collision circuit, or a connection interface (not shown) for connecting an external device with another circuit. Here, for example, the structural elements of the wireless communication unit 104 are connected to each other via a bus serving as a transmission path of data. Examples of the connection interface include a Universal Asynchronous Receiver Transmitter (UART), a Local Area Network (LAN) terminal, and a transceiving circuit.

The high-frequency signal generating unit 150 receives the high-frequency signal generation command from the control unit 106, and the high-frequency signal corresponding to the high-frequency signal generation command. Here, in FIG. 4, AC power is used as the high-frequency signal generating unit 150, but the high-frequency signal according to the present embodiment generating unit 150 is not limited to this example. For example, the high-frequency signal according to the present embodiment generating unit 150 may include a modulating circuit (not shown) that performs Amplitude Shift Keying (ASK) modulation and an amplifying circuit (not shown) that amplifies an output of the modulating circuit.

Here, for example, a high-frequency signal including the identification information transmission request to request the external connection device to transmit the identification information, a high-frequency signal including the receiving capability information transmission request to request the external connection device to transmit the receiving capability information, or a high-frequency signal including various kinds of processing commands or data to be processed may be used as the high-frequency signal generated by the high-frequency signal generating unit 150. However, the high-frequency signal generated by the high-frequency signal generating unit 150 is not limited to this example. For example, the high-frequency signal according to the present embodiment may be a signal (for example, a non-modulated signal) causing the power line communication unit 208 of the power receiving device 200A to perform power supply.

For example, the high-frequency transmitting unit 152 includes a coil (hereinafter, referred to as inductor) L1 having a predetermined inductance, and transmits the carrier wave corresponding to the high-frequency signal generated by the high-frequency signal generating unit 150. Further, the high-frequency transmitting unit 152 can receive the response signal from the external connection device. In other words, the high-frequency transmitting unit 152 can undertake a function of a communication antenna of the wireless communication unit 104. Here, FIG. 4 illustrates the example in which the high-frequency transmitting unit 152 is constituted by the coil L1, but the configuration of the high-frequency transmitting unit 152 according to the present embodiment is not limited to this example. For example, the high-frequency transmitting unit according to the present embodiment may further include a capacitor to configure a resonance circuit.

For example, the demodulating unit 154 demodulates the response signal from the external connection device by performing envelope detection on a change in amplitude of a voltage in an antenna end of the high-frequency transmitting unit 152 and binarizing the detected signal. The demodulating device of the response signal in the demodulating unit 154 is not limited to the above example, and, for example, the demodulating unit 154 can demodulate the response signal using a change in a phase of a voltage in the antenna end of the high-frequency transmitting unit 152.

Further, the demodulating unit 154 transfers the demodulated response signal to the control unit 106. Then, when the demodulated response signal is transmitted to the control unit 106, for example, the control unit 106 performs a variety of processing as processing of processing data corresponding to the response signal and processing of generating the high-frequency signal generation command based on the processing result.

For example, through the configuration illustrated in FIG. 4, the wireless communication unit 104 transmits the carrier wave, and demodulates the response signal transmitted from the external connection device such as the power receiving device 200A. Of course, the configuration of the wireless communication unit 104 according to the present embodiment is not limited to the configuration illustrated in FIG. 4.

1-2. Wireless Communication Unit 204 Arranged in Power Receiving Device According to Present Embodiment The wireless communication unit 204 includes a communication antenna 250 and an IC chip 252. For example, the structural elements of the wireless communication unit 204 are connected to each other via a bus 272 serving as a data transmission path.

The communication antenna 250 receives the carrier wave transmitted from the external connection device such as the power supply device 100A, and transmits the response signal based on a processing result of processing in the IC chip 252.

For example, the communication antenna 250 is constituted by a resonance circuit including a coil (inductor) L2 having a predetermined inductance and a capacitor C1 having a predetermined capacitance, and generates an inductive voltage by electromagnetic induction upon receiving the carrier wave. Then, the communication antenna 250 outputs a reception voltage obtained by resonating the inductive voltage at a predetermined resonance frequency. Here, for example, the resonance frequency in the communication antenna 250 is set according to the frequency of the carrier wave such as 13.56 [MHz]. Through the above-described configuration, the communication antenna 250 receives the carrier wave, and transmits the response signal by load modulation performed in a load modulating unit 264 (which will be described later) arranged in the IC chip 252.

The IC chip 252 demodulates and processes the high-frequency signal based on the received carrier wave, and transmits the response signal through the communication antenna 250 by the load modulation. In other words, the IC chip 252 functions substantially as a wireless communication unit that actively performs wireless communication in the wireless communication unit 204.

For example, the IC chip 252 includes a carrier detecting unit 254, a detecting unit 256, a regulator 258, a demodulating unit 260, a data processing unit 262, a load modulating unit 264, a Read Only Memory (ROM) 266, a Random Access Memory (RAM) 268, and an internal memory 270. The data processing unit 262, the ROM 266, the RAM 268, and the internal memory 270 are connected to one another, for example, via the bus 272 serving as a data transmission path. Although not shown in FIG. 4, for example, the IC chip 252 may further include a protection circuit (not shown) for preventing an overvoltage or an overcurrent from being applied to the data processing unit 262. Here, for example, a clamp circuit constituted by a diode and the like may be used as the protection circuit (not shown).

The carrier detecting unit 254 generates a detection signal of a rectangular shape based on the reception voltage transferred from the communication antenna 250, and transfers the detection signal to the data processing unit 262. For example, the data processing unit 262 uses the transferred detection signal as a processing clock for data processing. Here, the detection signal is based on the reception voltage transferred from the communication antenna 250 and thus synchronized with the frequency of the carrier wave transmitted from the external connection device. Thus, the IC chip 252 includes the carrier detecting unit 254 and thus can perform processing with the external connection device in synchronization with the external connection device.

The detecting unit 256 rectifies the reception voltage output from the communication antenna 250. Here, for example, the detecting unit 256 includes a diode D1 and a capacitor C2.

The regulator 258 converts the reception voltage into a constant voltage through smoothing, and outputs a driving voltage to the data processing unit 262. Here, for example, the regulator 258 uses a DC component of the reception voltage as the driving voltage.

The demodulating unit 260 demodulates the high-frequency signal based on the reception voltage, and outputs data (for example, a binary data signal having a high level and a low level) corresponding to the high-frequency signal included in the carrier wave. Here, for example, the demodulating unit 260 outputs an AC component of the reception voltage as data.

For example, the data processing unit 262 is driven using the driving voltage output from the regulator 258 as a power source, and processes data demodulated in the demodulating unit 260. Here, for example, the data processing unit 262 is constituted by an MPU, various processing circuits, or the like.

Further, the data processing unit 262 selectively generates a control signal used to control the load modulation related to the response to the external connection device according to the processing result. Then, the data processing unit 262 selectively outputs the control signal to the load modulating unit 264.

Further, for example, the data processing unit 262 reads data stored in the internal memory 270 based on a command included in the data demodulated in the demodulating unit 260 and updates the read data.

For example, the load modulating unit 264 includes a load Z and a switch SW1, and performs the load modulation by selectively connecting (validates) the load Z in response to the control signal transferred from the data processing unit 262. Here, for example, the load Z is constituted by a resistor having a predetermined resistance value, but the load Z is not limited to this example. For example, the switch SW1 is constituted by a p-channel type Metal Oxide Semiconductor Field Effect Transistor (MOSFET) or an n-channel type MOSFET, but the switch SW1 is not limited to this example.

The ROM 266 stores a program and control data such as a calculation parameter, which are used by the data processing unit 262. The RAM 268 temporarily stores a program executed by the data processing unit 262, a calculation result, an execution state, and the like.

The internal memory 270 is a storage unit arranged in the IC chip 252. For example, the internal memory 270 has a tamper resistance characteristic, and performs reading of data, new writing of data, updating of data, or the like through the data processing unit 262. For example, the internal memory 270 stores a variety of data such as identification information, receiving capability information, an electronic value, and an application. Here, FIG. 4 illustrates the example in which the internal memory 270 stores identification information 274 and an electronic value 276, but data stored in the internal memory 270 is not limited to this example.

For example, through the above-described configuration illustrated in FIG. 4, the IC chip 252 processes the high-frequency signal received through the communication antenna 250, and transmits the response signal from the communication antenna 250 through the load modulation.

For example, the wireless communication unit 204 includes the communication antenna 250 and the IC chip 252, and thus processes the high-frequency signal transmitted from the external connection device such as the power supply device 100A and transmits the response signal through the load modulation. Further, the configuration of the wireless communication unit 204 according to the present embodiment is not limited to the configuration illustrated in FIG. 4. For example, in the wireless communication unit 204, the structural elements configuring the IC chip 252 illustrated in FIG. 4 may not be configured in the form of an IC chip.

For example, when the wireless communication unit 104 illustrated in FIG. 4 is arranged in the power supply device according to the present embodiment, and the wireless communication unit 204 illustrated in FIG. 4 is arranged in the power receiving device according to the present embodiment, the power supply device according to the present embodiment and the power receiving device according to the present embodiment can perform wireless communication using the wireless communication technique such as the communication technique by NFC.

Here, by performing the wireless communication technique such as the communication technique by NFC or the wireless communication by the RFID technique, the power receiving device according to the present embodiment can be driven by power obtained from the received high-frequency signal and can transmit stored information by performing the load modulation. In other words, in the communication system including the power supply device according to the present embodiment and the power receiving device according to the present embodiment, the power receiving device according to the present embodiment can perform wireless communication even when a separate power supply circuit to perform communication is not arranged. Further, for example, the power receiving device according to the present embodiment can transmit stored information by performing the load modulation even when a signal (a signal representing the user's instruction) according to the user's operation is not input.

2. Power Line Communication of Present Embodiment

Next, the power line communication of the present embodiment will be described. FIG. 5 is an explanatory diagram for describing an example of the power line communication of the present embodiment. In the following, the power line communication of the present embodiment will be described using a power supply device 100B and a power receiving device 200B illustrated in FIG. 5 as an example. FIG. 5 illustrates structural elements related to the power line communication of the present embodiment in the configuration of the power supply device according to the present embodiment and the configuration of the power receiving device according to the present embodiment. In the power receiving device according to the present embodiment, for example, the structural elements related to the power line communication may be disposed in a plug as in the power receiving device 200A illustrated in FIG. 3.

2-1. Power Supply Device 100B

For example, the power supply device 100B includes a connecting unit 102, a control unit 106, a power line communication unit 108, a first filter 110 (a communication filter), and a second filter 112.

For example, the power supply device 100B may further include a ROM (not shown), a RAM (not shown), a storage unit (not shown), a display unit (not shown), and the like. For example, the structural elements of the power supply device 100B are connected to one another via a bus serving as a data transmission path. Here, the ROM (not shown) stores a program or control data such as a calculation parameter, which is used by the control unit 106. The RAM (not shown) temporarily stores a program executed by the control unit 106 or the like.

The storage unit (not shown) is a storing device that the power supply device 100B includes, and stores a variety of data including identification information acquired from the external connection device such as the power receiving device 200B, an application, and the like. Here, a magnetic recording medium such as a hard disk or a non-volatile memory such as an Electrically Erasable and Programmable Read Only Memory (EEPROM), a flash memory, a Magnetoresistive Random Access Memory (MRAM), a Ferroelectric Random Access Memory (FeRAM), and a Phase change Random Access Memory (PRAM) may be used as the storage unit (not shown). Further, the storage unit (not shown) may be removably mounted in the power supply device 100B.

The display unit (not shown) is a display device arranged in the power supply device 100B, and displays various pieces of information (for example, an image, text, and/or the like) on a display screen. For example, an operation screen through which a desired operation is performed on the power supply device 100B may be used as the screen displayed on the display screen of the display unit (not shown).

Here, a display device such as a Liquid Crystal Display (LCD) or an organic EL display (an Organic Electro-Luminescence display device or an Organic Light Emitting Diode display) may be used as the display unit (not shown). For example, in the power supply device 100B, the display unit (not shown) may be constituted by a touch screen. In this case, the display unit (not shown) can function as an operation display unit in which both the user operation and a display can be performed.

In addition, the power supply device 100B can perform communication with an external terminal via a network (or directly) regardless of the installation the display unit (not shown) and cause the operation screen or various information to be displayed on a display screen of an external terminal. For example, when the external terminal is the external terminal (for example, a portable communication device or a remote controller) possessed by the user of the power supply device 100B, the user can operate his/her external terminal and cause the power supply device 100B to perform desired processing, and can check information transmitted from the power supply device 100B using the external terminal. Thus, in this case, for example, when the power supply device 100B is installed below a desk and it is not easy for the user to directly operate the power supply device 100B or to see information displayed on the display unit (not shown), the user's convenience can be improved.

The control unit 106 is constituted by an MPU or an IC circuit in which various kinds of circuits are integrated, and controls the components of the power supply device 100B. More specifically, for example, the control unit 106 controls the communication in the power line communication unit 108 by transferring the high-frequency signal generation command or the high-frequency signal transmission stop command to the power line communication unit 108 based on the detection signal transferred from the connecting unit 102 or the response signal of the external connection device such as the power receiving device 200B transferred from the power line communication unit 108. Here, as the control unit 106 transfers the high-frequency signal generation command or the high-frequency signal transmission stop command to the power line communication unit 108 based on the detection signal, communication with the external connection device which is the external device connected via the power line can be actually performed.

As the control unit 106 transfers the high-frequency signal generation command or the high-frequency signal transmission stop command to the power line communication unit 108 as described above, for example, the power line communication unit 108 can transmit the high-frequency signal based on the detection result in the connecting unit 102. Further, as the control unit 106 transfers the high-frequency signal generation command or the high-frequency signal transmission stop command to the power line communication unit 108 based on the response signal, it is possible to control communication with the external connection device such as the power receiving device 200B, which is performed via the power line. In addition, for example, as the control unit 106 transfers the high-frequency signal generation command to the power line communication unit 108 at regular intervals or irregular intervals, it is possible to cause the power line communication unit 108 to transmit the high-frequency signal at regular intervals or irregular intervals.

Further, the control unit 106 actively performs the process related to the power supply method according to the present embodiment (for example, the process from (1) (the power source specifying process) to the process (4) (the power control process)) as described above. In the control unit 106 arranged in the power supply device according to the present embodiment, an example of a configuration to implement the process related to the power supply method according to the present embodiment will be described later.

The power line communication unit 108 undertakes communication with the external connection device such as the power receiving device 200B via the power line.

FIG. 6 is an explanatory diagram illustrating an example of a configuration of the power line communication unit 108 arranged in the power supply device 100B according to the present embodiment. Here, in FIG. 6, the control unit 106 and the first filter 110 are illustrated together. For example, the power line communication unit 108 includes a high-frequency signal generating unit 156 and a demodulating unit 158, and functions as a reader/writer (or an interrogator) in the NFC or the like. For example, the power line communication unit 108 may further include an encryption circuit (not shown) or a communication anti-collision circuit.

For example, upon receiving the high-frequency signal generation command transferred from the control unit 106, the high-frequency signal generating unit 156 generates the high-frequency signal corresponding to the high-frequency signal generation command. Further, upon receiving the high-frequency signal transmission stop command that is transferred from the control unit 106 and represents the transmission stop of the high-frequency signal, the high-frequency signal generating unit 156 stops the generation of the high-frequency signal. Here, in FIG. 6, AC power is illustrated as the high-frequency signal generating unit 156, but the high-frequency signal generating unit 156 according to the present embodiment is not limited to this example. For example, the high-frequency signal according to the present embodiment generating unit 132 may include a modulating circuit (not shown) that performs ASK modulation and an amplifying circuit (not shown) that amplifies an output of the modulating circuit.

Here, for example, the high-frequency signal including the identification information transmission request to request the external connection device to transmit the identification information, a high-frequency signal including the receiving capability information transmission request to request the external connection device to transmit the receiving capability information, or the high-frequency signal including various kinds of processing commands on the external connection device or data to be processed may be used as the high-frequency signal generated by the high-frequency signal generating unit 156. However, the high-frequency signal generated by the high-frequency signal generating unit 156 is not limited to this example. For example, the high-frequency signal according to the present embodiment may be a signal (for example, a non-modulated signal) causing the power line communication unit 208 of the power receiving device 200B to perform power supply.

For example, the demodulating unit 158 demodulates the response signal from the external connection device by performing envelope detection on a change in amplitude of a voltage between the high-frequency signal generating unit 156 and the first filter 110 and binarizing the detected signal. Then, the demodulating unit 158 transfers the demodulated response signal (for example, the response signal representing the identification information or the response signal representing the response based on processing corresponding to the high-frequency signal) to the control unit 106. The demodulating device of the response signal in the demodulating unit 158 is not limited to the above example, and, for example, the demodulating unit 158 can demodulate the response signal using a change in a phase of a voltage between the high-frequency signal generating unit 156 and the first filter 110.

For example, through the configuration illustrated in FIG. 6, the power line communication unit 108 of the present embodiment can function as the reader/writer in the NFC or the like and perform communication with the external connection device via the power line.

The configuration of the power line communication unit 108 of the present embodiment is not limited to the configuration illustrated in FIG. 6. FIG. 7 is an explanatory diagram illustrating another example of the power line communication unit 108 arranged in the power supply device 100B according to the present embodiment. Here, in FIG. 7, the control unit 106 and the first filter 110 are illustrated together, similarly to FIG. 6.

The power line communication unit 108 related to another example includes a high-frequency signal generating unit 156, a demodulating unit 158, a first high-frequency transceiving unit 160, and a second high-frequency transceiving unit 162. For example, the power line communication unit 108 related to another example may further include an encryption circuit (not shown) or a communication anti-collision circuit.

The high-frequency signal generating unit 156 generates the high-frequency signal in response to the high-frequency signal generation command, and stops the generation of the high-frequency signal in response to the high-frequency signal transmission stop command, similarly to the high-frequency signal generating unit 156 illustrated in FIG. 6.

The demodulating unit 158 demodulates the response signal from the external connection device by performing envelope detection on a change in amplitude of a voltage in an antenna end of the high-frequency signal generating unit 156 and binarizing the detected signal. The demodulating device of the response signal in the demodulating unit 158 is not limited to the above example, and, for example, the demodulating unit 158 can demodulate the response signal using a change in a phase of a voltage in the antenna end of the high-frequency signal generating unit 156.

For example, the first high-frequency transceiving unit 160 includes a coil (inductor) L3 having a predetermined inductance and a capacitor C3 having a predetermined capacitance and so configures a resonance circuit. Here, for example, the frequency of the high-frequency signal such as 13.56 [MHz] may be used as the resonance frequency of the first high-frequency transceiving unit 160. Through the above-described configuration, the first high-frequency transceiving unit 160 can transmit the high-frequency signal generated by the high-frequency signal generating unit 156, and receive the response signal transmitted from the external connection device through the second high-frequency transceiving unit 162. In other words, the first high-frequency transceiving unit 160 functions as a first communication antenna in the power line communication unit 108.

For example, the second high-frequency transceiving unit 162 includes a coil L4 having a predetermined inductance and a capacitor C4 having a predetermined capacitance and so configures a resonance circuit. Here, for example, the frequency of the high-frequency signal such as 13.56 [MHz] may be used as the resonance frequency of the second high-frequency transceiving unit 162. Through the above-described configuration, the second high-frequency transceiving unit 162 can receive the high-frequency signal transmitted from the first high-frequency transceiving unit 160 and transmit the response signal transmitted from the external connection device. In other words, the second high-frequency transceiving unit 162 functions as a second communication antenna in the power line communication unit 108.

Through the configuration illustrated in FIG. 7, the power line communication unit 108 of the present embodiment can function as the reader/writer in NFC and perform communication with the external connection device via the power line, similarly to the configuration illustrated in FIG. 6.

In the power supply device 100B according to the present embodiment, an example of a configuration related to the power line communication of the present embodiment will be described with reference to FIG. 5 again. The first filter 110 is connected between the power line communication unit 108 and the power line PL, and functions to filter a signal transferred from the power line PL. More specifically, the first filter 110 has a function of blocking at least a signal of a frequency of power supplied from the external connection device such as the power receiving device 200B via the power among signals transferred from the power line PL but passing the high-frequency signal. The power supply device 100B includes the first filter 110 and thus does not transfer a signal of a frequency of power that may cause noise to the power line communication unit 108. Thus, it is possible to improve the accuracy of communication between the power line communication unit 108 and the external connection device (more technically, for example, a power line communication unit arranged in the external connection device such as the power line communication unit 208 of the power receiving device 200B, which will be described later).

FIG. 8 is an explanatory diagram illustrating an example of a configuration of the first filter 110 arranged in the power supply device 100B according to the present embodiment. The first filter 110 includes coils L5 and L6, capacitors C5 to C7 and surge absorbers SA1 to SA3. Of course, the configuration of the first filter 110 according to the present embodiment is not limited to the configuration illustrated in FIG. 8.

In the power supply device 100B according to the present embodiment, an example of a configuration of the power line communication of the present embodiment will be described with reference to FIG. 5 again. The second filter 112 is disposed on the power line PL between the connecting unit 102 and the power, and functions to perform filtering on a signal transferred from the connecting unit 102 side. Here, for example, an external power source such as a commercial power source or an internal power source such as a battery may be used as a power source according to the present embodiment.

More specifically, the second filter 112 has a function of blocking at least the high-frequency signal transmitted by the power line communication unit 108 or the high-frequency signal transmitted by the external connection device but passing a signal of a frequency of power supplied to the external connection device. The power supply device 100B includes the second filter 112 and thus can block, for example, the high-frequency signal related to the communication via the power line or a noise component such as a noise component transferred from the external connection device side. In other words, the second filter 112 functions as a so-called power splitter.

FIG. 9 is an explanatory diagram illustrating an example of a configuration of the second filter 112 arranged in the power supply device 100B according to the present embodiment. The second filter 112 includes coils L7 and L8, a capacitor C8, and a surge absorber SA4. Of course, the configuration of the second filter 112 according to the present embodiment is not limited to the configuration illustrated in FIG. 9.

For example, through the configuration illustrated in FIG. 5, the power supply device 100B according to the present embodiment can perform communication with the external connection device such as the power receiving device 200B connected to the connecting unit 102 via the power line. Further, for example, through the configuration illustrated in FIG. 5, the power supply device 100B according to the present embodiment can cause the external connection device to perform a predetermined process based on the transmitted high-frequency signal such as transmission of the identification information and an accounting process using an electronic value.

2-2. Power Receiving Device 200B

For example, the power receiving device 200B includes a connecting unit 202, a first filter 206, a power line communication unit 208, and a second filter 210.

For example, the power receiving device 200B includes a battery (not shown) and various kinds of devices (for example, an MPU, various kinds of processing circuits, and a driving device (not shown)) for implementing the function of the power receiving device 200B, which are arranged at the stage subsequent to the second filter 210 (on the side of the second filter 210 illustrated in FIG. 5 opposite to the power supply device 100B). In other words, for example, the power receiving device 200B can cause the battery (not shown) to be charged by power supplied from the external connection device such as the power supply device 100B via the power line and can implement the function of the power receiving device 200B using the supplied power. For example, when the power receiving device 200B is a vehicle such as an electric vehicle, the power receiving device 200B is supplied with power to charge an internal battery and rotates a vehicle using power from the battery. Further, when the power receiving device 200B includes a display device capable of displaying an image (a moving image/a still image) and/or text, the power receiving device 200B is supplied with power and causes an image or text to be displayed on the display screen of the display device.

The first filter 206 is connected between the power line (technically, the power line PL in the power receiving device 200B) and the power line communication unit 208, and functions to perform filtering on a signal transferred from the power line. More specifically, the first filter 206 has a function of blocking at least a signal of a frequency of power among signals transferred from the power line but passing the high-frequency signal. The power receiving device 200B includes the first filter 206 and thus does not transfer a signal of a frequency of power that causes a noise to the power line communication unit 208. Thus, it is possible to improve the accuracy of communication between the power line communication unit 208 and the external connection device (more technically, for example, the power line communication unit arranged in the external connection device such as the power line communication unit 108 of the power supply device 100B.

Here, for example, the first filter 206 has the same configuration as the first filter 110 of the power supply device 100B illustrated in FIG. 8. Of course, the configuration of the first filter 206 according to the present embodiment is not limited to the configuration illustrated in FIG. 8.

The power line communication unit 208 performs communication with the external connection device such as the power supply device 100B via the power line based on the high-frequency signal. More specifically, for example, when the power line communication unit 208 receives the high-frequency signal from the external connection device, the power line communication unit 208 is driven by power obtained from the high-frequency signal and performs processing based on the received high-frequency signal. Then, the power line communication unit 208 transmits the response signal according to the above processing as the high-frequency signal through the load modulation.

For example, upon receiving a high-frequency signal including an identification information transmission request to request transmission of identification information, the power line communication unit 208 reads the stored identification information based on the identification information transmission request included in the high-frequency signal. Then, the power line communication unit 208 transmits the read identification information such that the read identification information is superimposed on the power line by load modulation. Further, for example, upon receiving a high-frequency signal including a power receiving capability information transmission request to request transmission of power receiving capability information, the power line communication unit 208 reads the stored power receiving capability information based on the power receiving capability information transmission request included in the high-frequency signal. Then, the power line communication unit 208 transmits the read power receiving capability information such that the read power receiving capability information is superimposed on the power line by load modulation. Further, for example, upon receiving the high-frequency signal including various kinds of processing commands or data to be processed, the power line communication unit 208 performs the process based on a processing command or data included in the high-frequency signal. Then, the power line communication unit 208 transmits a response signal based on the above process such that the response signal is superimposed on the power line by load modulation. In other words, for example, the power line communication unit 208 functions as a responder in NFC or the like.

FIG. 10 is an explanatory diagram illustrating an example of a configuration of the power line communication unit 208 arranged in the power receiving device 200B according to the present embodiment. Here, FIG. 10 illustrates this together with the first filter 206. Further, FIG. 10 illustrates a configuration in which the power line communication unit 208 includes an IC chip 280 that demodulates and processes the received high-frequency signal and transmits the response signal through the load modulation. In the power line communication unit 208 of the present embodiment, each of structural elements configuring the IC chip 280 illustrated in FIG. 10 may not be configured in the form of an IC chip.

For example, the IC chip 280 includes a detecting unit 254, a detecting unit 256, a regulator 258, a demodulating unit 260, a data processing unit 262, and a load modulating unit 264. Although not shown in FIG. 10, for example, the IC chip 280 may further include a protection circuit (not shown) for preventing an overvoltage or an overcurrent from being applied to the data processing unit 262. Here, for example, a clamp circuit constituted by a diode or the like may be used as the protection circuit (not shown).

For example, the IC chip 280 includes a ROM 266, a RAM 268, and an internal memory 270. For example, the data processing unit 262, the ROM 266, the RAM 268, and the internal memory 270 are connected to one another via a bus 272 serving as a data transmission path.

Here, when the configuration of the IC chip 280 illustrated in FIG. 10 is compared with the configuration of the IC chip 252 arranged in the wireless communication unit 204 illustrated in FIG. 4 which relates to the wireless communication according to the present embodiment, it can be understood that the IC chip 280 has the same configuration as the IC chip 252 illustrated in FIG. 4.

As described above, the high-frequency signal based on the received carrier wave is input to the IC chip 252 illustrated in FIG. 4 through the communication antenna 250, and the IC chip 252 modulates and processes the high-frequency signal based on the carrier wave received by the communication antenna 250, and transmits the response signal to the communication antenna 250 through the load modulation. On the other hand, the high-frequency signal transmitted from the external connection device such as the power supply device 100B, which is transferred from the first filter 206, is input to the IC chip 280. Further, the IC chip 280 has the same configuration as the IC chip 252 illustrated in FIG. 4 as illustrated in FIG. 10. Thus, the IC chip 280 can demodulate and process the input high-frequency signal and transmit the response signal corresponding to the high-frequency signal through the load modulation, similarly to the IC chip 252 illustrated in FIG. 4.

Further, the IC chip 280 is connected to the first filter 206 as illustrated in FIG. 10, and the first filter 206 is connected to the power line PL as illustrated in FIG. 5. Thus, the response signal transmitted from the IC chip 280 is superimposed on the power line through the first filter 206.

For example, through the configuration illustrated in FIG. 10, the IC chip 280 processes the received high-frequency signal, and performs transmission such that the processed signal is superimposed on the response signal through the load modulation. Of course, the configuration of the IC chip 280 according to the present embodiment is not limited to the configuration illustrated in FIG. 10.

For example, through the configuration illustrated in FIG. 10, the power line communication unit 208 can be driven by power obtained from the received high-frequency signal, perform processing represented by the received high-frequency signal, and transmit the response signal according to the processing through the load modulation.

The power line communication unit 208 of the present embodiment is not limited to the configuration illustrated in FIG. 10. FIG. 11 is an explanatory diagram illustrating another example of the configuration of the power line communication unit 208 arranged in the power receiving device 200B according to the present embodiment. Here, FIG. 11 illustrates this together with the first filter 206. In the power line communication unit 208 of the present embodiment, each of structural elements configuring the IC chip 280 illustrated in FIG. 11 may not be configured in the form of an IC chip.

The power line communication unit 208 according to another example includes a first high-frequency transceiving unit 282, a second high-frequency transceiving unit 284, and an IC chip 280.

For example, the first high-frequency transceiving unit 282 includes a coil L9 having a predetermined inductance and a capacitor C9 having a predetermined capacitance and so configures a resonance circuit. Here, for example, the frequency of the high-frequency signal such as 13.56 [MHz] may be used as the resonance frequency of the first high-frequency transceiving unit 282. Through the above-described configuration, the first high-frequency transceiving unit 282 can transmit the high-frequency signal transferred from the first filter 206, and receive the response signal transmitted from the second high-frequency transceiving unit 284. In other words, the first high-frequency transceiving unit 282 functions as a first communication antenna in the power line communication unit 208.

For example, the second high-frequency transceiving unit 284 includes a coil L10 having a predetermined inductance and a capacitor C10 having a predetermined capacitance and so configures a resonance circuit. Here, for example, the frequency of the high-frequency signal such as 13.56 [MHz] may be used as the resonance frequency of the second high-frequency transceiving unit 284. Through the above-described configuration, the second high-frequency transceiving unit 284 can receive the high-frequency signal transmitted from the first high-frequency transceiving unit 282 and transmit the response signal. More specifically, the second high-frequency transceiving unit 284 generates an inductive voltage through the electromagnetic induction upon receiving the high-frequency signal, and outputs a reception voltage obtained by resonating the inductive voltage at a predetermined resonance frequency to the IC chip 280. Further, the second high-frequency transceiving unit 284 transmits the response signal through the load modulation performed in the load modulating unit 264 arranged in the IC chip 280. In other words, the second high-frequency transceiving unit 284 functions as a second communication antenna in the power line communication unit 208.

The IC chip 280 performs the same processing as in the IC chip 280 illustrated in FIG. 10 based on the reception voltage transferred from the second high-frequency transceiving unit 284.

Even through the configuration illustrated in FIG. 11, the power line communication unit 208 can be driven by power obtained from the received high-frequency signal, perform processing represented by the received high-frequency signal, and transmit the response signal according to the processing through the load modulation, similarly to the configuration illustrated in FIG. 10. Further, when the power line communication unit 208 has the configuration illustrated in FIG. 11, the power line communication unit 208 can use an IC chip related to, for example, NFC or RFID, and thus there is an advantage in that implementation can be easily performed.

In the power receiving device 200B according to the present embodiment, an example of the configuration of the power line communication of the present embodiment will be described with reference to FIG. 5 again. The second filter 210 functions to perform filtering on a signal transferred from the external connection device side such as the power supply device 100B through the power line PL. More specifically, the second filter 210 has a function of blocking at least the high-frequency signal transmitted by the external connection device or the high-frequency signal transmitted by the power line communication unit 208 but passing a signal of a frequency of power supplied through the power line PL. The power receiving device 200B includes the second filter 210 and thus can block, for example, the high-frequency signal related to the communication via the power line or a noise component such as a noise component transferred from the external connection device side. In other words, the second filter 210 functions as a so-called power splitter, similarly to the second filter 112 arranged in the power supply device 100B.

Here, for example, the second filter 210 may have the same configuration as the second filter 112 of the power supply device 100B illustrated in FIG. 9. Of course, the configuration of the second filter 210 according to the present embodiment is not limited to the configuration illustrated in FIG. 9.

For example, as the power supply device according to the present embodiment includes the power line communication unit 108 illustrated in FIG. 5, and the power receiving device according to the present embodiment includes the power line communication unit 208 illustrated in FIG. 5, the power supply device according to the present embodiment and the power receiving device according to the present embodiment can perform power line communication in which the wireless communication technique such as the communication technique by NFC is applied to the wired communication.

Here, the communication device using the wireless communication technique such as the communication technique by NFC is much smaller in circuit size than an existing PLC modem, and thus the size of the communication device can be reduced to the same size as an IC chip. For example, with the spread of devices capable of performing communication using the wireless communication technique such as the communication technique by the NFC, for example, a portable telephone in which an IC card or an IC chip is mounted, the communication device using the wireless communication technique such as the communication technique by the NFC or RFID technique is cheaper than an existing PLC modem.

Further, as the wireless communication technique such as the communication technique by the NFC or RFID technique is applied to the wired communication, the power receiving device according to the present embodiment can be driven by power obtained from the received high-frequency signal through the power line and can transmit stored information by performing the load modulation. In other words, in the communication system including the power supply device according to the present embodiment and the power receiving device according to the present embodiment, the power receiving device according to the present embodiment can perform wired communication even when a separate power supply circuit to perform communication is not arranged. Further, for example, the power receiving device according to the present embodiment can transmit stored information by performing the load modulation even when a signal (a signal representing the user's instruction) according to the user's operation is not input.

Thus, when the wireless communication technique such as the communication technique by the NFC or the RFID technique is used, it is possible to implement wired communication in which a cost is low, a limitation on the size of a communication device is mitigated, and power consumption is low, more than, for example, when conventional wired communication such as an existing PLC is used.

(Power Supply Device According to Present Embodiment)

Next, the description will proceed with an example of a configuration of the power supply device according to the present embodiment which can perform the process related to the power supply method according to the present embodiment. In the following, an example of a configuration of the power supply device according to the present embodiment will be described in connection with an example in which the power supply device according to the present embodiment and the power receiving device (the external device of the power supply target) have the configuration of FIG. 5 in which communication is performed through the power line communication according to the present embodiment.

FIG. 12 is an explanatory diagram illustrating an example of a configuration of the power supply device 100 according to the present embodiment. Here, FIG. 11 illustrates this together with the power receiving device 200B illustrated in FIG. 5.

For example, the power supply device 100 includes a connecting unit 102, a control unit 106, a power line communication unit 108, a first filter 110, a second filter 112, and a power supply unit 114.

The power supply device 100 may further include, for example, a ROM (not shown), a RAM (not shown), a storage unit (not shown), a display unit (not shown), and an external communication unit (not shown). For example, the structural elements with of the power supply device 100 are connected with one another via a bus serving as a data transmission path.

The external communication unit (not shown) is a communication unit arranged in the power supply device 100, and performs communication with an external device such as a server via a network (or directly) in a wired/wireless manner. Further, communication of the external communication unit (not shown) is controlled, for example, by the control unit 106.

Here, for example, a communication antenna and a radio frequency (RF) circuit (wireless communication), an IEEE802.15.1 port and a transceiving circuit (wireless communication), an IEEE802.11b port and a transceiving circuit (wireless communication), or a local area network (LAN) terminal and a transceiving circuit (wired communication) may be used as the external communication unit (not shown). Further, the external communication unit (not shown) may have a configuration conforming to an arbitrary communication standard such as a universal serial bus (USB) terminal and a transceiving circuit or a configuration capable of performing communication such as an external device via a network. Examples of the network according to the present embodiment includes a wired network such as a LAN or a wide area network (WAN), a wireless network such as a wireless LAN (WLAN) or a wireless WAN (WWAN) via a base station, and the Internet using a communication protocol such as a transmission control protocol/Internet protocol (TCP/IP).

For example, the control unit 106 is configured with an MPU, various kinds of processing circuits, or the like, and functions to control the power supply device 100 in general. For example, the control unit 106 includes a power source specifying unit 120, a power receiving capability specifying unit 122, a collating unit 124, and a power control unit 126, and actively performs the process related to the power supply method according to the present embodiment.

The power source specifying unit 120 actively performs the process (1) (the power source specifying process), and specifies the type of power source. More specifically, for example, the power source specifying unit 120 specifies the type of power source based on a measurement result of an index related to electric power supplied from a power source, which is transferred from the power supply unit 114, the power source type information acquired though the power line, which is transferred from the power supply unit 114, the power source type information acquired by communication with the external device in the external communication unit (not shown), or the like.

The power receiving capability specifying unit 122 actively perform the process (2) (the power receiving capability specifying process), and specifies the power receiving capability of the external device of the power supply target. More specifically, for example, the power receiving capability specifying unit 122 specifies the power receiving capability of the external device of the power supply target based on information acquired from the external device of the power supply target by communication with the external device of the power supply target.

The collating unit 124 actively performs the process (3) (the collating process), and collates the type of power source specified in the power source specifying unit 120 with the power receiving capability specified in the power receiving capability specifying unit 122. More specifically, for example, the collating unit 124 collates the specified type of power source with the specified power receiving capability by determining whether or electric power supplied from a power source whose type is specified exceeds the specified power receiving capability of the external device of the power supply target.

The power control unit 126 actively performs the process (4) (the power control process), and causes corresponding electric power to be transmitted to the external device of the power supply target based on the collation result in the collating unit 124 (the principle processing). More specifically, for example, the power control unit 126 causes corresponding electric power to be transmitted to the external device of the power supply target by transferring a control signal based on the collation result in the collating unit 124 to the power supply unit 114.

Further, for example, the power control unit 126 determines whether or not it is possible for the power supply unit 114 to transmit corresponding electric power to the external device of the power supply target. For example, when there is no power source that supplies corresponding electric power to the external device of the power supply target or when it is difficult for the power supply unit 114 to perform conversion to electric power corresponding to the external device of the power supply target, the power control unit 126 determines that it is difficult for the power supply unit 114 to transmit electric power corresponding to the external device of the power supply target. Then, when it is not determined that it is difficult to cause corresponding electric power to be supplied to the external device of the power supply target, the power control unit 126 does not transmit electric power to the external device of the power supply target (the exceptional process). Here, for example, the power control unit 126 does not cause electric power to be transmitted to the external device of the power supply target by transferring the control signal to the power supply unit 114.

For example, the control unit 106 includes the power source specifying unit 120, the power receiving capability specifying unit 122, the collating unit 124, and the power control unit 126, and thus actively performs the process related to the power supply method according to the present embodiment.

A configuration of a control unit arranged in the power supply device according to the present embodiment is not limited to the configuration illustrated in FIG. 12. For example, the control unit according to the present embodiment may further include an authenticating unit that performs the above-described authentication process. Here, when the authenticating unit is provided, for example, the collating unit 124 selectively performs the process (3) (the collating process) based on the authentication result. Further, when the authenticating unit is provided, for example, the power control unit 126 causes electric power to be selectively transmitted to the external device of the power supply target based on the authentication result.

For example, the power supply device according to the present embodiment may individually include one or more of the power source specifying unit 120, the power receiving capability specifying unit 122, the collating unit 124, the power control unit 126, and the authenticating unit (when the authenticating unit is provided) (for example, each unit may be implemented by an individual processing circuit).

The power line communication unit 108 actively functions as a communication unit (a part of the communication unit) that performs communication with the external connection device (an example of the external device of the power supply target). For example, as described above with reference to FIGS. 6 and 7, communication in the power line communication unit 108 is controlled, for example, by the control unit 106, and the power line communication unit 108 transfers the demodulated response signal to the control unit 106.

For example, the power supply unit 114 selectively connects the power source (for example, an internal power source or one or more external power sources) with the power line PL based on the control signal transferred from the control unit 106 (more technically, the power control unit 126), and selectively supplies electric power to the power line PL. Further, for example, the power supply unit 114 selectively converts electric power supplied from a power source based on the control signal transferred from the control unit 106 (more technically, the power control unit 126), and supplies the converted electric power to the power line PL.

Here, for example, a switch that is turned on or off based on a control signal transferred from the control unit 106 or a circuit configured with various kinds of converting circuits such as an alternating current to direct current (AC-DC) converter, an alternating current to alternating current (AC-AC) converter, or an inverter may be used as the power supply unit 114. For example, the switch is configured with a p-channel type MOSFET or an n-channel type MOSFET, but a configuration of the switch is not limited to this example. Further, the power supply unit 114 may have an arbitrary capability of transmitting corresponding electric power to the external device of the power supply target based on a control signal transferred from the control unit 106.

For example, through the configuration illustrated in FIG. 12, the power supply device 100 performs the process related to the power supply method according to the present embodiment (for example, the process (1) (the power source specifying process) to the process (4) (the power control process)). Thus, for example, through the configuration illustrated in FIG. 12, the power supply device 100 can cause electric power that does not exceed the power receiving capability of the power receiving device (the external connection device) to be received by the power receiving device. Further, for example, through the configuration illustrated in FIG. 12, the power supply device 100 can improve the user's convenience.

The configuration of the power supply device according to the present embodiment is not limited to the configuration illustrated in FIG. 12.

1. First Modified Example

For example, when the device (or circuit) having the function corresponding to the power supply unit 114 is not provided as an external device (or circuit) of the power supply device according to the present embodiment, the power supply device according to the present embodiment may not include the power supply unit 114. In this case, even when the power supply unit 114 is not provided, the power supply device according to the first modified example of the present embodiment can perform the process (1) (the power source specifying process) to the process (4) (the power control process) by controlling the device (or circuit) having a function corresponding to the power supply unit 114, for example, in the same way as control of the power supply unit 114. Thus, the power supply device according to the first modified example of the present embodiment can have the same effect as the power supply device 100 illustrated in FIG. 12.

2. Second Modified Example

Further, for example, the power supply device according to the present embodiment may have a configuration in which the communication unit performing communication with the external connection device (the power receiving device) such as the power line communication unit 108 and the first filter 110 or the structural element related to communication such as the second filter 112 is not provided. Even when the communication unit that performs communication with the external connection device is not provided, the power supply device according to the second modified example of the present embodiment can perform the process (1) (the power source specifying process) to the process (4) (the power control process). Thus, the power supply device according to the second modified example of the present embodiment can have the same effect as the power supply device 100 illustrated in FIG. 12.

3. Third Modified Example

For example, FIG. 12 illustrates the configuration in which the power supply device and the power receiving device (an example of the external connection device) according to the present embodiment perform communication with each other through the power line communication according to the present embodiment. However, the power supply device and the power receiving device according to the present embodiment can perform communication through the wireless communication according to the present embodiment. More specifically, when communication is performed through the wireless communication according to the present embodiment, for example, the power supply device and the power receiving device according to the present embodiment have the configuration of FIG. 3 in which communication is performed through the wireless communication according to the present embodiment instead of the configuration of FIG. 5 in which communication is performed through the power line communication according to the present embodiment.

Here, even when the configuration in which communication is performed through the wireless communication according to the present embodiment is provided, the power supply device according to the third modified example of the present embodiment can perform the process (1) (the power source specifying process) to the process (4) (the power control process). Thus, the power supply device according to the third modified example of the present embodiment can have the same effect as the power supply device 100 illustrated in FIG. 12.

4. Fourth Modified Example

Further, for example, the power supply device according to the present embodiment may have both the configuration in which communication is performed through the power line communication according to the present embodiment and the configuration in which communication is performed through the wireless communication according to the present embodiment. More specifically, for example, the power supply device according to the present embodiment has both the configuration of FIG. 3 in which communication is performed through the wireless communication according to the present embodiment and the configuration of FIG. 5 in which communication is performed through the power line communication according to the present embodiment.

Here, when both the configuration in which communication is performed through the power line communication according to the present embodiment and the configuration in which communication is performed through the wireless communication according to the present embodiment are provided, the power supply device according to the fourth modified example of the present embodiment can perform the process (1) (the power source specifying process) to the process (4) (the power control process). Thus, the power supply device according to the fourth modified example of the present embodiment can have the same effect as the power supply device 100 illustrated in FIG. 12.

5. Fifth Modified Example

Further, for example, when electric power is transmitted in a wireless manner, the power supply device according to the present embodiment may not include the connecting unit 102. Here, when electric power is transmitted in a wireless manner, the power supply device according to the present embodiment includes a power transmission device related to wireless power transmission such as a power transmission device related to transmission of electric power using electromagnetic induction, a power transmission device related to transmission of electric power using radio waves (microwaves), a power transmission device related to transmission of electric power using resonance of a magnetic field, or a power transmission device related to transmission of electric power using resonance of an electric field.

6. Sixth Modified Example

The power supply device according to the present embodiment may have an arbitrary combination configuration such as a configuration in which the configuration according to the first modified example is combined with the configuration according to the second modified example, a configuration in which the configuration according to the first modified example is combined with the configuration according to the third modified example, a configuration in which the configuration according to the first modified example is combined with the configuration according to the fourth modified example, or a configuration in which the configuration according to the first modified example is combined with the configuration according to the fifth modified example.

(Power Receiving Device According to Present Embodiment)

Next, the description will proceed with an example of a configuration of the power receiving device according to the present embodiment which can perform the process related to the power receiving method according to the present embodiment. In the following, an example of a configuration of the power receiving device according to the present embodiment will be described in connection with an example in which the power receiving device and the power supply device according to the present embodiment perform communication with each other through the power line communication of the present embodiment illustrated in FIG. 5. FIG. 13 is an explanatory diagram illustrating an example of a configuration of the power receiving device 200 according to the present embodiment.

For example, the power receiving device 200 includes a connecting unit 202, a first filter 206, a power line communication unit 208, a second filter 210, a control unit 212, and a converting unit 214. Further, for example, the power receiving device 200 includes a battery (not shown), various kinds of devices (not shown) for implementing the function of the power receiving device 200, and the like, which are arranged at the stage subsequent to the converting unit 214 (at the side of the converting unit 214 illustrated in FIG. 13 opposite to the connecting unit 202). The control unit 212 may be one of structural elements for implementing the function of the power receiving device 200.

The power line communication unit 208 functions as the communication unit that performs communication with the external device by performing load modulation based on the signal transmitted from the external device as described above with reference to FIGS. 10 and 11.

The control unit 212 is configured with an MPU, various kinds of processing circuits, or the like, and functions to control the power receiving device 200 in general. Further, for example, the control unit 212 includes a power source specifying unit 220, a power receiving capability specifying unit 222, a collating unit 224, and a power control unit 226, and actively performs the process related to the power receiving method according to the present embodiment.

The power source specifying unit 220 actively performs the process (I) (the power source specifying process) and specifies the type of power source. More specifically, for example, the power source specifying unit 220 specifies the type of power source based on the measurement result of an index related to electric power supplied from a power source, which is transferred from the converting unit 214, the power source type information acquired though the power line, which is transferred from the converting unit 214, the power source type information acquired by communication with the external device in the power line communication unit 208, or the like.

The power receiving capability specifying unit 222 actively performs the process (II) (the power receiving capability specifying process), and specifies the power receiving capability of the own device (the power receiving device 200). More specifically, for example, the power receiving capability specifying unit 222 specifies the power receiving capability of the own device based on the power receiving capability information or the identification information which is stored in the recording medium such as the internal memory 270 illustrated in FIG. 10 or 11.

The collating unit 224 actively performs the process (III) (the collating process), and collates the type of power source specified in the power source specifying unit 220 with the power receiving capability specified in the power receiving capability specifying unit 222. More specifically, for example, the collating unit 224 collates the specified type of power source with the specified power receiving capability by determining whether or not electric power supplied from a power source whose type is specified exceeds the power receiving capability of the own device (the power receiving device 200).

The power control unit 226 actively performs the process (IV) (the power control process), and causes corresponding electric power to be received by the own device (the power receiving device 200) (the principle processing) based on the collation result in the collating unit 224. More specifically, for example, the power control unit 226 transfers a control signal based on the collation result in the collating unit 224 to the converting unit 214 and causes corresponding electric power to be received by the own device (the power receiving device 200).

Further, for example, the power control unit 226 determines whether or not it is possible for the converting unit 214 to perform conversion to electric power corresponding to the power receiving device 200. For example, when a capability required for conversion of electric power to be transmitted exceeds a conversion capability in the converting unit 214, the power control unit 226 determines that it is difficult for the converting unit 214 to perform conversion to electric power corresponding to the power receiving device 200. Then, when it is determined that it is difficult for the converting unit 214 to perform conversion to electric power corresponding to the power receiving device 200, the power control unit 226 causes power reception not to be performed (the exceptional process). Here, for example, the power control unit 226 transfers a control signal to the converting unit 214 and causes the converting unit not to perform power reception.

For example, the control unit 212 includes the power source specifying unit 220, the power receiving capability specifying unit 222, the collating unit 224, and the power control unit 226, and thus actively performs the process related to the power receiving method according to the present embodiment.

The configuration of the control unit arranged in the power receiving device according to the present embodiment is not limited to the configuration illustrated in FIG. 13. For example, the control unit according to the present embodiment may further include an authenticating unit that performs the above-described authentication process. Here, when the authenticating unit is provided, for example, the collating unit 224 selectively performs the process (III) (the collating process) based on the authentication result. Further, when the authenticating unit is provided, for example, the power control unit 226 causes electric power to be transmitted to be selectively received based on the authentication result.

For example, the converting unit 214 selectively converts electric power transmitted via the power line based on the control signal transferred from the control unit 212 (more technically, the power control unit 226). Then, the converting unit 214 transmits electric power transmitted via the power line or the converted electric power to various kinds of devices (not shown) for implementing the function of the power receiving device 200.

Further, for example, when the exceptional process is performed in the power control unit 226, the converting unit 214 causes electric power not to be transmitted to various kinds of devices (not shown) for implementing the function of the power receiving device 200 based on the control signal transferred from the control unit 212 (more technically, the power control unit 226).

Here, for example, a switch that is turned on or off based on a control signal transferred from the control unit 212 or a circuit configured with various kinds of converting circuits such as an AC-DC converter, an AC-AC converter, or an inverter may be used as the converting unit 214. For example, the switch is configured with a p-channel type MOSFET or an n-channel type MOSFET, but a configuration of the switch is not limited to this example. Further, for example, the converting unit 214 may have any configuration capable of performing selective conversion of electric power or selective transmission of electric power based on the control signal transferred from the control unit 212.

For example, through the configuration illustrated in FIG. 13, the power receiving device 200 performs the process related to the power receiving method according to the present embodiment (for example, the process (I) (the power source specifying process) to the process (IV) (the power control process)). Thus, for example, through the configuration illustrated in FIG. 13, the power receiving device 200 can cause electric power that does not exceed the power receiving capability of the own device (the power receiving device 200) to be received. Further, for example, through the configuration illustrated in FIG. 13, the power receiving device 200 can improve the user's convenience.

The configuration of the power receiving device according to the present embodiment is not limited to the configuration illustrated in FIG. 13.

1. First Modified Example

For example, the power receiving device according to the present embodiment may have a configuration in which the communication unit performing communication with the external device such as the power supply device such as the first filter 206 and the power line communication unit 208 or the structural element related to communication such as the second filter 210 is not provided. Even when the communication unit performing communication with the external device such as the power supply device is not provided, the power receiving device according to the first modified example of the present embodiment can perform the process (I) (the power source specifying process) to the process (IV) (the power control process). Thus, the power receiving device according to the first modified example of the present embodiment can have the same effect as the power receiving device 200 illustrated in FIG. 13.

2. Second Modified Example

Further, for example, FIG. 13 illustrates the configuration in which the power receiving device according to the present embodiment performs communication through the power line communication according to the present embodiment. However, the power receiving device according to the present embodiment can perform communication through the wireless communication according to the present embodiment. More specifically, when communication is performed through the wireless communication according to the present embodiment, for example, the power receiving device according to the present embodiment has the configuration of FIG. 3 in which communication is performed through the wireless communication according to the present embodiment instead of the configuration of FIG. 5 in which communication is performed through the power line communication according to the present embodiment.

Here, even when the configuration in which communication is performed through the wireless communication according to the present embodiment is provided, the power receiving device according to the second modified example of the present embodiment can perform the process (I) (the power source specifying process) to the process (IV) (the power control process). Thus, the power receiving device according to the second modified example of the present embodiment can have the same effect as the power receiving device 200 illustrated in FIG. 13.

3. Third Modified Example

Further, for example, the power receiving device according to the present embodiment may have both the configuration in which communication is performed through the power line communication according to the present embodiment and the configuration in which communication is performed through the wireless communication according to the present embodiment. More specifically, for example, the power receiving device according to the present embodiment has the configuration of FIG. 3 in which communication is performed through the wireless communication according to the present embodiment and the configuration of FIG. 5 in which communication is performed through the power line communication according to the present embodiment.

Here, when both the configuration in which communication is performed through the power line communication according to the present embodiment and the configuration in which communication is performed through the wireless communication according to the present embodiment are provided, the power receiving device according to the third modified example of the present embodiment can perform the processes from (I) (the power source specifying process) to (IV) (the power control process). Thus, the power receiving device according to the third modified example of the present embodiment can have the same effect as the power receiving device 200 illustrated in FIG. 13.

4. Fourth Modified Example

Further, for example, when electric power is transmitted in a wireless manner, the power receiving device according to the present embodiment may not include the connecting unit 202. When electric power is transmitted in a wireless manner, for example, the power receiving device according to the present embodiment includes a power receiving device related to wireless power transmission such as a power receiving device related to transmission of electric power using electromagnetic induction, a power receiving device related to transmission of electric power using radio waves (microwaves), a power receiving device related to transmission of electric power using resonance of a magnetic field, or a power receiving device related to transmission of electric power using resonance of an electric field.

5. Other Modified Example

For example, the power receiving device according to the present embodiment may have a so-called reader/writer function, similarly to the power supply device according to the present embodiment.

Hereinbefore, the power supply device has been described as the present embodiment, but the present embodiment is not limited to this example. For example, the present embodiment can be applied to various machines or facilities such as electrical outlets installed in buildings or the like, devices that supply power to computers such as personal computers (PCs) or servers, multi-plugs, electric vehicles, power-driven devices, or the like, display devices, or the like. In addition, for example, the present embodiment can be applied to vehicles such as electric vehicles or hybrid cars that undertake the function of the power supply device. Moreover, the power supply device according to the present embodiment may receive power transmitted from the external connection device. In other words, the power supply device according to the present embodiment may undertake the function of the power receiving device.

Further, the power receiving device has been described as the present embodiment, and the present embodiment is not limited to this example. For example, the present embodiment can be applied to various devices driven by electric power such as communication devices such as computers such as PC, mobile phones, or smart phones, video/audio reproducing devices (or video/audio recording/reproducing devices), portable game machines, display devices, television receivers, lighting devices, toasters, and vehicles driven by electric power such as electric vehicles or hybrid cars. For example, the present embodiment can be applied to plugs. In addition, the power receiving device according to the present embodiment may transmit electric power to the external connection device. In other words, the power receiving device according to the present embodiment may undertake the function of the power supply device.

(Program According to Present Embodiment)

1. Program According to Power Supply Device According to Present Embodiment

A program (for example, a program capable of executing the process related to the notice control method according to the present embodiment in the power supply device according to the present embodiment such as the process from (1) (the power source specifying process) to (4) (the power control process)) causing a computer to function as the power supply device according to the present embodiment is executed in a computer so that the power receiving device receives the electric power which does not exceed the power receiving capability of the power receiving device.

2. Program According to Power Receiving Device According to Present Embodiment

A program (for example, a program capable of executing the process related to the notice control method according to the present embodiment in the power receiving device according to the present embodiment such as the process from (I) (the power source specifying process) to (IV) (the power control process)) capable of causing a computer to function as the power receiving device according to the present embodiment is executed in a computer, so that the power receiving device according to the present embodiment can cause electric power that does not exceed the power receiving capability of the own device to be received.

It should be understood by those skilled in the art that various modifications, combinations, sub-combinations and alterations may occur depending on design requirements and other factors insofar as they are within the scope of the appended claims or the equivalents thereof.

For example, it has been described above that a program (computer program) causing a computer to function as the power supply device according to the present embodiment or the power receiving device according to the present embodiment is provided. However, in the present embodiment, a recording medium recording each program described above or a recording medium recording both programs can be provided as well.

The above-described configuration illustrates an example of the present embodiment, and it should be understood that the above-described configuration belongs to the technical scope of the present disclosure.

Additionally, the present technology may also be configured as below.

(A1) A power supply device (100), comprising: a power source specifying unit (120) for specifying (S100) a type of a power source; a power receiving capability specifying unit (122) for specifying (S102) a power receiving capability of a power receiving device (200); a collating unit (124) for performing collation (S104) of the specified type of the power source with the specified power receiving capability; and a power control unit (126) for controlling (S108, S110, S112, S114) transmission of electric power from the power source of the specified type to the power receiving device (200) based on the collation.

(A2) The power supply device (100) of (A1), wherein performing collation of the specified type of the power source with the specified power receiving capability comprises verifying that power supplied from the power source of the specified type does not exceed the specified power receiving capability.

(A3) The power supply device of (A1), wherein performing collation of the specified type of the power source with the specified power receiving capability comprises verifying that power supplied from the power source of the specified type exceeds the specified power receiving capability.

(A4) The power supply device (100) of (A1), wherein performing collation of the specified type of the power source with the specified power receiving capability comprises determining (S106) whether electric power supplied from the power source of the specified type exceeds the specified power receiving capability.

(A5) The power supply device of (A1), wherein performing collation of the specified type of the power source with the specified power receiving capability comprises comparing the specified type of the power source with the specified power receiving capability.

(A6) The power supply device (100) of any of (A1) to (A5), further comprising a communication unit (104, 108) for performing communication with the power receiving device (200).

(A7) The power supply device (100) of (A6), wherein performing communication with the power receiving device (200) comprises transmitting a transmission signal to the power receiving device and receiving a response signal from the power receiving device, the power receiving device providing the response signal by performing load modulation based on the transmission signal.

(A8) The power supply device (100) of (A6) or (A7), wherein specifying the power receiving capability of the power receiving device comprises specifying (S102) the power receiving capability of the power receiving device (200) based on power receiving capability information received using the communication unit (104, 108).

(A9) The power supply device (100) of (A6) or (A7), wherein specifying the power receiving capability of the power receiving device comprises specifying (S102) the power receiving capability of the power receiving device (200) based on identification information received using the communication unit (104, 108).

(A10) The power supply device (100) of any of (A6) to (A9), wherein the communication unit is a wireless communication unit (104) for performing communication wirelessly using an antenna (152).

(A11) The power supply device (100) of any of (A6) to (A9), wherein: the communication unit is a power line communication unit (108) for performing communication via a power line (PL), and the power supply device further comprises a first filter (110) for blocking a signal of a first frequency, the first filter being connected between the power line communication unit and the power line (PL).

(A12) The power supply device of (A1), wherein: the power source specifying unit is for specifying a plurality of types of power sources; the collating unit is for performing collation of the plurality of specified types of power sources with the specified power receiving capability, and for selecting, from a plurality of power sources of the specified plurality of types, a power source that is configured to supply electric power that does not exceed the specified power receiving capability of the power receiving device; and the power control unit is for controlling transmission of electric power from the selected power source to the power receiving device based on the collation.

(D1) A power supply method, comprising: specifying (S100) a type of a power source; specifying (S102) a power receiving capability of a power receiving device (200); performing collation (S104) of the specified type of the power source with the specified power receiving capability; and controlling (S108, S110, S112, S114) transmission of electric power from the power source of the specified type to the power receiving device (200) based on the collation.

(D2) The method of (D1), wherein performing collation of the specified type of the power source with the specified power receiving capability comprises verifying that power supplied from the power source of the specified type does not exceed the specified power receiving capability.

(D3) The method of (D1), wherein performing collation of the specified type of the power source with the specified power receiving capability comprises verifying that power supplied from the power source of the specified type exceeds the specified power receiving capability.

(D4) The method of (D1), wherein performing collation of the specified type of the power source with the specified power receiving capability comprises determining (S106) whether electric power supplied from the power source of the specified type exceeds the specified power receiving capability.

(D5) The method of any of (D1) to (D5), further comprising performing communication with the power receiving device (200).

(D6) The method of (D5), wherein performing communication with the power receiving device (200) comprises transmitting a transmission signal to the power receiving device and receiving a response signal from the power receiving device, the power receiving device providing the response signal by performing load modulation based on the transmission signal.

(D7) The method of any of (D1) to (D6), wherein specifying the power receiving capability of the power receiving device comprises specifying (S102) the power receiving capability of the power receiving device (200) based on power receiving capability information received from the power receiving device.

(D8) The method of any of (D1) or (D6), wherein specifying the power receiving capability of the power receiving device comprises specifying (S102) the power receiving capability of the power receiving device (200) based on identification information received from the power receiving device.

(D9) The method of any of (D5) to (D8), wherein performing communication comprises performing communication wirelessly using an antenna (152).

(D10) The method of any of (D5) to (D8), wherein performing communication comprises performing communication via a power line (PL) and through a first filter (110).

(B1) A power receiving device (200), comprising: a power source specifying unit (220) for specifying (S200) a type of a power source; a power receiving capability specifying unit (222) for specifying (S202) a power receiving capability of the power receiving device; a collating unit (224) for performing collation (S204) of the specified type of the power source with the specified power receiving capability; and a power control unit (226) for controlling selective conversion of electric power transmitted from the power source of the specified type to the power receiving device, the controlling based on the collation.

(B2) The power receiving device of (B1), wherein performing collation of the specified type of the power source with the specified power receiving capability comprises verifying that power supplied from the power source of the specified type does not exceed the specified power receiving capability.

(B3) The power receiving device of (B1), wherein performing collation of the specified type of the power source with the specified power receiving capability comprises verifying that power supplied from the power source of the specified type exceeds the specified power receiving capability.

(B4) The power receiving device (200) of (B1), wherein performing the collation of the specified type of the power source with the specified power receiving capability comprises determining (S206) whether electric power supplied from the power source of the specified type exceeds the specified power receiving capability.

(B5) The power receiving device (200) of (B1), wherein performing collation of the specified type of the power source with the specified power receiving capability comprises comparing the specified type of the power source with the specified power receiving capability.

(B6) The power receiving device (200) of any of (B1) to (B5), further comprising a converting unit (214) for selectively converting, based on a control signal provided by the power control unit, the electric power transmitted from the power source (226) to the power receiving device.

(B7) The power receiving device of (B6), wherein the converting unit converts the electric power transmitted from the power source into second electric power that does not exceed the specified power receiving capability in a case where the electric power exceeds the specified power receiving capability.

(B8) The power receiving device (200) of any of (B1) to (B7), further comprising a communication unit (204, 208) for performing communication with a power supply device (100).

(B9) The power receiving device (200) of (B8), wherein performing communication with the power supply device (100) comprises performing load modulation based on a signal received from the power supply device.

(B10) The power receiving device (200) of (B8) or (B9), wherein specifying (S200) the type of the power source comprises specifying (S200) the type of the power source based on power source type information received using the communication unit (204, 208).

(B11) The power receiving device (200) of any of (B8) to (B10), wherein the communication unit is a wireless communication unit (204) for performing communication wirelessly using an antenna (250).

(B12) The power receiving device (200) of any of (B8) to (B10), wherein the communication unit is a power line communication unit (208) configured to perform communication via a power line (PL), and
the power receiving device further comprises a first filter (206) for blocking a signal of a first frequency, the first filter being connected between the power line communication unit and the power line (PL).

(E1) A power receiving method, comprising: specifying (S200) a type of a power source; specifying (S202) a power receiving capability of a power receiving device; performing collation (S204) of the specified type of the power source with the specified power receiving capability; and controlling, based on the collation, selective conversion of electric power transmitted from the power source of the specified type to the power receiving device.

(E2) The power receiving method (E1), wherein performing collation of the specified type of the power source with the specified power receiving capability comprises verifying that power supplied from the power source of the specified type does not exceed the specified power receiving capability.

(E3) The power receiving method of (E1), wherein performing collation of the specified type of the power source with the specified power receiving capability comprises verifying that power supplied from the power source of the specified type exceeds the specified power receiving capability.

(E4) The power receiving method of (E1), wherein performing the collation of the specified type of the power source with the specified power receiving capability comprises determining (S206) whether electric power supplied from the power source of the specified type exceeds the specified power receiving capability.

(E5) The power receiving method of any of (E1) to (E4), further comprising performing the selective conversion of the electric power transmitted from the power source to the power receiving device.

(E6) The power receiving method of (E5), wherein performing the selective conversion comprises converting the electric power transmitted from the power source into second electric power that does not exceed the specified power receiving capability, in a case where the electric power exceeds the specified power receiving capability.

(E7) The power receiving method of any of (E1) to (E6), further comprising performing communication with a power supply device (100).

(E8) The power receiving method of (E7), wherein performing communication with the power supply device (100) comprises performing load modulation based on a signal received from the power supply device.

(E9) The power receiving method of (E7) or (E8), wherein specifying (S200) the type of the power source comprises specifying (S200) the type of the power source based on power source type information received from the power supply device (100).

(E10) The power receiving method of any of (E7) to (E9), wherein performing communication with the power supply device comprises performing communication wirelessly using an antenna (250).

(E11) The power receiving method of any of (E7) to (E9), wherein performing communication with the power supply device comprises performing communication via a power line (PL) and through a first filter (206) for blocking a signal of a first frequency.

(C1) A power supply device (100), comprising: a power source specifying unit (120) for specifying (S100) a plurality of types of power sources; a power receiving capability specifying unit (122) for specifying (S102) a power receiving capability of a power receiving device (200); a collating unit (124) for performing collation (S104) of the plurality of specified types of power sources with the specified power receiving capability, and for selecting, from a plurality of power sources of the specified plurality of types, a power source that is configured to supply electric power that does not exceed the specified power receiving capability of the power receiving device; and a power control unit (126) for controlling (S108, S110, S112, S114) transmission of electric power from the selected power source to the power receiving device (200) based on the collation.

(C2) The power supply device (100) of (C1), wherein performing collation of the plurality of specified types of power sources with the specified power receiving capability comprises verifying that power supplied from the plurality of power sources of the specified plurality of types does not exceed the specified power receiving capability.

(C3) The power supply device (100) of (C1), wherein performing collation of the plurality of specified types of power sources with the specified power receiving capability comprises verifying that power supplied from the plurality of power sources of the specified plurality of types exceeds the specified power receiving capability.

(C4) The power supply device (100) of (C1), wherein performing collation of the plurality of specified types of power sources with the specified power receiving capability comprises determining (S106) whether electric power supplied from the plurality of power sources of the plurality of specified types exceeds the specified power receiving capability.

(F1) A power supply method, comprising: specifying (S100) a plurality of types of power sources; specifying (S102) a power receiving capability of a power receiving device (200); performing collation (S104) of the plurality of specified types of power sources with the specified power receiving capability; selecting, from a plurality of power sources of the specified plurality of types, a power source that is configured to supply electric power that does not exceed the specified power receiving capability of the power receiving device; and controlling (S108, S110, S112, S114) transmission of electric power from the selected power source to the power receiving device (200) based on the collation.

(F2) The power supply method of (F1), wherein performing collation of the plurality of specified types of power sources with the specified power receiving capability comprises verifying that power supplied from the plurality of power sources of the specified plurality of types does not exceed the specified power receiving capability.

(F3) The power supply method of (F1), wherein performing collation of the plurality of specified types of power sources with the specified power receiving capability comprises verifying that power supplied from the plurality of power sources of the specified plurality of types exceeds the specified power receiving capability.

(F4) The power supply method of (F1), wherein performing collation of the plurality of specified types of power sources with the specified power receiving capability comprises determining (S106) whether electric power supplied from the plurality of power sources of the plurality of specified types exceeds the specified power receiving capability.

(G1)

A power supply device, including:

a power source specifying unit that specifies a type of power source supplying electric power;

a power receiving capability specifying unit that specifies a power receiving capability of an external device of a power supply target;

a collating unit that collates the specified type of power source with the specified power receiving capability; and a power control unit that causes corresponding electric power to be transmitted to the external device of the power supply target based on the collation result.

(G2)

The power supply device according to (G1), further including a communication unit that performs communication with the external device of the power supply target, wherein the power receiving capability specifying unit specifies the power receiving capability of the external device of the power supply target based on information acquired from the external device of the power supply target by communication with the external device of the power supply target in the communication unit.

(G3)

The power supply device according to (G2), wherein the communication unit acquires the information transmitted as load modulation is performed in the external device of the power supply target.

(G4)

The power supply device according to (G3), wherein the communication unit includes a power line communication unit that transmits a high-frequency signal having a frequency higher than a frequency of the electric power via a power line used to transmit electric power, and performs communication with the external device of the power supply target, and a communication filter that is connected between the power line communication unit and the power line, blocks at least a signal having the frequency of the electric power, and does not block the high-frequency signal.

(G5)

The power supply device according to (G3), wherein the communication unit includes a communication antenna that transmits a carrier wave corresponding to a high-frequency signal having a frequency higher than a frequency of the electric power, and a wireless communication unit that transmits the high-frequency signal through the communication antenna, and performs communication with the external device of the power supply target.

(G6)

The power supply device according to (G2), wherein the power receiving capability specifying unit specifies the external device of the power supply target based on identification information representing the external device of the power supply target, which is acquired from the external device of the power supply target by communication with the external device of the power supply target in the communication unit, and specifies a power receiving capability corresponding to the specified external device of the power supply target.

(G7)

The power supply device according to (G2), wherein the power receiving capability specifying unit specifies a power receiving capability of the external device of the power supply target based on power receiving capability information representing a power receiving capability of the external device of the power supply target, which is acquired from the external device of the power supply target by communication with the external device of the power supply target in the communication unit.

(G8)

The power supply device according to (G1), wherein the collating unit collates the specified type of power source with the specified power receiving capability, and determines whether or not electric power supplied from a power source whose type is specified exceeds the specified power receiving capability, the power control unit converts the electric power supplied from the power source whose type is specified into electric power that does not exceed the specified power receiving capability when the determination result which is the collation result represents that the power receiving capability is exceeded, and transmits the converted electric power, and the power control unit transmits the electric power supplied from the power source whose type is specified when the determination result which is the collation result does not represent that the power receiving capability is exceeded.

(G9)

The power supply device according to (G1), wherein when a plurality of types of power sources are specified by the power receiving capability specifying unit, the collating unit collates the specified type of power source with the specified power receiving capability, and selects a power source capable of supplying electric power that does not exceed the specified power receiving capability from among the plurality of power sources whose type is specified, and the power control unit selectively transmits electric power supplied from a power source, which does not exceed the specified power receiving capability, based on the selection result of the power source which is the collation result.

(G10)

A power receiving device, including:

a power source specifying unit that specifies a type of power source supplying electric power to be transmitted;

a power receiving capability specifying unit that specifies a power receiving capability of an own device;

a collating unit that collates the specified type of power source with the specified power receiving capability; and a power control unit that causes corresponding electric power to be received by the own device based on the collation result.

(G11)

The power receiving device according to (G10), further including a converting unit that selectively converts electric power to be transmitted, wherein the collating unit collates the specified type of power source with the specified power receiving capability, and determines whether or not electric power supplied from a power source whose type is specified exceeds the specified power receiving capability, the power control unit causes the converting unit to convert electric power to be transmitted into electric power that does not exceed the specified power receiving capability when the determination result which is the collation result represents that the power receiving capability is exceeded, and the power control unit does not cause the converting unit to convert electric power to be transmitted when the determination result which is the collation result does not represent that the power receiving capability is exceeded.

(G12)

A power supply method, including:

specifying a type of power source supplying electric power;

specifying a power receiving capability of an external device of a power supply target; collating the specified type of power source with the specified power receiving capability; and causing corresponding electric power to be transmitted to the external device of the power supply target based on the collation result.

(G13)

A power receiving method, including:

specifying a type of power source supplying electric power to be transmitted;

specifying a power receiving capability of an own device;

collating the specified type of power source with the specified power receiving capability; and causing corresponding electric power to be received by the own device based on the collation result.

(G14)

A program causing a computer to execute:

specifying a type of power source supplying electric power;

specifying a power receiving capability of an external device of a power supply target;

collating the specified type of power source with the specified power receiving capability; and causing corresponding electric power to be transmitted to the external device of the power supply target based on the collation result.

(G15)

A program causing a computer to execute:

specifying a type of power source supplying electric power to be transmitted;

specifying a power receiving capability of an own device;

collating the specified type of power source with the specified power receiving capability; and causing corresponding electric power to be received by the own device based on the collation result.

REFERENCE SIGNS LIST 100, 100A, 100B Power Supply Device
102, 202 Connecting Unit
104, 204 Wireless Communication Unit
106, 212 Control Unit
108, 208 Power Line Communication Unit
110, 206 First Filter
112, 210 Second Filter
114 Power Supply Unit
120, 220 Power Source Specifying Unit
122, 222 Power Receiving Capability Specifying Unit
124, 224 Collating Unit
126, 226 Power Control Unit
200, 200A, 200B Power Receiving Device
214 Converting Unit

The invention claimed is:

1. A power supply device, comprising:
circuitry configured to:
determine a type of a power source, wherein the type of the power source corresponds to at least a first electric power supplied from the power source;
acquire power receiving capability data of a power receiving device, wherein the power receiving capability data indicates at least a second electric power of the power receiving device;
verify that the at least first electric power supplied from the type of the power source is less than or equal to the at least second electric power of the power receiving device; and
control, based on the verification of the at least first electric power and the at least second electric power, transmission of the at least first electric power from the power source to the power receiving device.

2. The power supply device of claim 1, wherein the circuitry is further configured to communicate with the power receiving device.

3. The power supply device of claim 2, wherein the circuitry is further configured to:
transmit a first signal to the power receiving device; and
receive a response signal from the power receiving device based on load modulation of the first signal.

4. The power supply device of claim 3, wherein the circuitry is further configured to communicate with the power receiving device via antenna.

5. The power supply device of claim 3, further comprising:
a first filter connected to a power line, wherein the first filter is configured to block a second signal of a first frequency.

6. The power supply device of claim 3, wherein the circuitry is further configured to communicate with the power receiving device via a power line.

7. The power supply device of claim 2, wherein the circuitry is further configured to determine the at least second electric power of the power receiving device based on the power receiving capability data.

8. The power supply device of claim 2, wherein the circuitry is further configured to:
acquire identification information of the power receiving device; and
determine the at least second electric power of the power receiving device based on the identification information.

9. The power supply device of claim 1, wherein the circuitry is further configured to verify that the at least first electric power supplied from the power source is more than the at least second electric power of the power receiving device.

10. The power supply device of claim 1, wherein the circuitry is further configured to determine the at least first electric power supplied from the power source is more than the at least second electric power of the receiving device.

11. The power supply device of claim 1, wherein the circuitry is further configured to compare the at least first electric power from the power source with the at least second electric power of the power receiving device.

12. The power supply device of claim 1, wherein the circuitry is further configured to:
   determine a type of each of a plurality of power sources,
      wherein the type of each of the plurality of power sources corresponds to at least a third electric power supplied from each of the plurality of power sources, and
      wherein the plurality of power sources include the power source;
   verify, based on the power receiving capability data, that the at least third electric power from each of the plurality of power sources is less than or equal to the at least second electric power of the power receiving device;
   select, based on the verification, one of the plurality of power sources; and
   control, based on the verification, transmission of the at least first electric power from the one of the plurality of power sources to the power receiving device.

13. A power receiving device, comprising:
   circuitry configured to:
      determine a type of a power source of a power supply device, wherein the type of the power source corresponds to at least a first electric power supplied from the power source;
      determine at least a second electric power of the power receiving device based on power receiving capability data of the power receiving device;
      verify that the at least first electric power supplied from the type of the power source is greater than the at least second electric power of the power receiving device; and
      control, based on the verification of the at least first electric power and the at least second electric power, selective conversion of the at least first electric power from the power source.

14. The power receiving device of claim 13, wherein the circuitry is further configured to communicate with the power supply device.

15. The power receiving device of claim 14, wherein the circuitry is further configured to:
   receive a first signal from the power supply device; and
   generate a response signal based on load modulation of the first signal.

16. The power receiving device of claim 15, wherein the circuitry is further configured to communicate with the power receiving device via an antenna.

17. The power receiving device of claim 15, further comprising:
   a first filter connected to a power line, wherein the first filter is configured to block a second signal of a first frequency.

18. The power receiving device of claim 15, wherein the circuitry is further configured to communicate with the power supply device via a power line.

19. The power receiving device of claim 14, wherein the circuitry is further configured to:
   acquire power source type information of the power supply device; and
   determine the type of the power source based on the power source type information.

20. The power receiving device of claim 13, wherein the circuitry is further configured to verify that the at least first electric power supplied from the power source is less than or equal to the at least second electric power of the power receiving device.

21. The power receiving device of claim 13, wherein the circuitry is further configure to determine that the at least first electric power supplied from the power source is more than the at least second electric power of the power receiving device.

22. The power receiving device of claim 13, wherein the circuitry is further configured to compare the at least first electric power from the the power source with the at least second electric power of the power receiving device.

23. The power receiving device of claim 13, wherein the circuitry is further configured to:
   receive a control signal based on the verification; and
   selectively convert the at least first electric power based on the control signal.

24. The power receiving device of claim 23, wherein the circuitry is further configured to convert the at least first electric power to the at least second electric power.

* * * * *